US008865116B2

(12) United States Patent
Yu et al.

(10) Patent No.: US 8,865,116 B2
(45) Date of Patent: Oct. 21, 2014

(54) METHOD FOR PREPARATION OF HEMATITE IRON OXIDE WITH DIFFERENT NANOSTRUCTURES AND HEMATITE IRON OXIDE PREPARED THEREBY

(71) Applicant: Korea University Research and Business Foundation, Seoul (KR)

(72) Inventors: Jong-Sung Yu, Seoul (KR); Nitin Kaduba Chaudhari, Seoul (KR); Hyoung Chan Kim, Seoul (KR); Chul Sung Kim, Seoul (KR); Jeunghee Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 13/670,907

(22) Filed: Nov. 7, 2012

(65) Prior Publication Data

US 2013/0251624 A1 Sep. 26, 2013

(30) Foreign Application Priority Data

Mar. 20, 2012 (KR) ........................ 10-2012-0028245

(51) Int. Cl.
*C01G 5/02* (2006.01)
*C01G 49/06* (2006.01)
*C01G 49/02* (2006.01)
*H01F 1/00* (2006.01)
*B82Y 40/00* (2011.01)
*B82Y 25/00* (2011.01)

(52) U.S. Cl.
CPC .............. *C01G 49/06* (2013.01); *B82Y 40/00* (2013.01); *Y10S 977/896* (2013.01); *C01G 49/02* (2013.01); *C01P 2002/72* (2013.01); *C01P 2002/82* (2013.01); *C01P 2004/03* (2013.01); *C01P 2004/04* (2013.01); *C01P 2004/16* (2013.01); *C01P 2004/32* (2013.01); *C01P 2004/38* (2013.01); *C01P 2004/40* (2013.01); *C01P 2006/12* (2013.01); *C01P 2006/42* (2013.01); *B82Y 25/00* (2013.01); *H01F 1/0072* (2013.01); *Y10S 977/773* (2013.01)
USPC ........................... 423/633; 977/773; 977/896

(58) Field of Classification Search
USPC ........................................... 423/633; 977/773
See application file for complete search history.

(56) References Cited

PUBLICATIONS

Chaudhari, N. K., et al. "Solvent controlled synthesis of new hematite superstructures with large coercive values". CrystEngComm, 2012, 14, 2024-2031.*

(Continued)

*Primary Examiner* — Richard M Rump
(74) *Attorney, Agent, or Firm* — Alston & Bird LLP

(57) ABSTRACT

Disclosed is a method for preparing hematite iron oxide having various nanostructures, including: preparing a mixture solution by adding iron chloride and caffeine to a solvent and magnetically stirring; and performing hydrothermal synthesis, wherein the solvent is selected from water, ethanol, propanol and methanol. In accordance with the present disclosure, hematite iron oxide ($\alpha$-$Fe_2O_3$) superstructures of various shapes, including grape, cube, dumbbell and microsphere shapes, can be synthesized in different solvents using caffeine. The shapes can be controlled variously via a simple one-step synthesis route without using a growth-inducing agent and without separation based on size. The prepared hematite iron oxide exhibits high coercivity at room temperature owing to its fine crystal structures and anisotropic shapes. The hematite iron oxide nanoparticles having different nanostructures prepared according to the present disclosure may be widely useful in biological and biochemical applications as a material having peroxidase mimic activity and thus capable of replacing natural enzymes.

5 Claims, 24 Drawing Sheets

(56) References Cited

PUBLICATIONS

P.A. Rit'eros, J.E. Dutrizac. "The precipitation of hematite from ferric chloride media" Hydrometallurgy 46 (1997) 85-104.*

Authors: Chaudhari, Nitin K.; Fang, Baizeng; Bae, Tae-Sung; Yu, Jong-Sung. Low Temperature Synthesis of Single Crystalline Iron Hydroxide and Oxide Nanorods in Aqueous Media. Journal of Nanoscience and Nanotechnology, vol. 11, No. 5, May 2011, pp. 4457-4462(6).*

N. K. Chaudhari, H. C. Kim, D. Son and J.-S. Yu; "Easy Synthesis and Characterization of Single-Crystalline Hexagonal Prism-Shaped Hematite $\alpha$-$Fe_2O_3$ in Aqueous Media"; *CrystEngComm*, 2009, 11, 2264-2267.

J. Lan, D. Cao, and W. Wang; "$Li_{12}Si_{60}H_{60}$ Fullerene Composite: A Promising Hydrogen Storage Medium"; *ACSNano*, 2009, 3, 3294-3300.

Z. An, J. Zhang, S. Pan and F. Yu; "Facile Template-Free Synthesis and Characterization of Elliptic $\alpha$-$Fe_2O_3$ Superstructures"; *J. Phys. Chem. C*, 2009, 113, 8092-8096.

L. P. Zhu, H. M. Xiao, X. M. Liu and S. Y. Fu; "Template-Free Synthesis and Characterization of Novel 3D Urchin-Like $\alpha$-$Fe_2O_3$ Superstructures"; *J. Mater. Chem.*, 2006, 16, 1794-1797.

S. Mitra, S. Das, K. Mandal and S. Chanduari; "Synthesis of a $\alpha$-$Fe_2O_3$ Nanocrystal in its Different Morphological Attributes: Growth Mechanism, Optical and Magnetic Properties"; *Nanotechnology*, 2007, 18, 275608(1-9).

S. Mitra, S. Das, S. Basu, P. Sahu and K. Mandal; "Shape- and Field-Dependent Morin Transitions in Structured $\alpha$-$Fe_2O_3$"; *J. Magn. Magn. Mater.*, 2009, 321, 2925-2931.

Zhang, Peng; Guo, Zai Ping; Liu, Hua Kun; "Submicron-sized cube-like $\alpha$-$Fe_2O_3$ agglomerates as an anode material for Li-ion batteries"; Electrochimica Acta 55 (2010) pp. 8521-8526.

* cited by examiner

US 8,865,116 B2

METHOD FOR PREPARATION OF HEMATITE IRON OXIDE WITH DIFFERENT NANOSTRUCTURES AND HEMATITE IRON OXIDE PREPARED THEREBY

TECHNICAL FIELD

The present disclosure relates to a method for preparing hematite iron oxide having various nanostructures. More particularly, it relates to a method for preparing hematite iron oxides having peroxidase mimic activity and having various shapes, sizes and nanostructures through a fast, environment-friendly and simple one-step synthesis route without using a template and hematite iron oxides prepared thereby.

BACKGROUND

It will be an epochal work in the field of nanotechnology if it is possible to control the structure and unique properties of metal oxides in nanometer scale. A technique of extending a one-dimensional nanostructure into a two-dimensional (2D) or three-dimensional (3D) regular through assembly is garnering a lot of attentions in the field of materials chemistry. It is because materials with different structures and crystal shapes are thought to have different electrical and optical properties in general. Accordingly, preparation of metal oxide with controlled structures and shapes is necessary.

Hematite ($\alpha$-$Fe_2O_3$), an n-type semiconductor with a band gap of 2.1 eV, is the most stable, non-toxic, corrosion-resistant, magnetic iron oxide under ambient conditions. Due to its low cost, high corrosion-resistance and superior environment friendliness, this metal oxide has been actively studied for use in gas sensors, rechargeable lithium batteries, catalysts, biological and medical applications, magnetic recording, pollution control, optical instruments, or the like. Until now, there have been a lot of efforts to elaborately prepare iron oxides of various shapes including nanorod, nanotube, nanowire, nanobelt, hexagonal prism, spindle, snowflake, urchin, nanoring, flake, nanocrystal, nanocube and mesopore. However, there have been few researches the preparation of hematite superstructures in a simple and environment-friendly manner. Especially, a method of preparing novel hematite with desired structure and shape via a simple route without using a template has not been developed yet. For preparation of $\alpha$-$Fe_2O_3$ nanoparticle, various techniques such as sol-gel method, microemulsion method, self-assembly, hydrothermal method, chemical precipitation and forced hydrolysis have been developed. Among them, the hydrothermal method has been widely used owing to easy control of nanoparticle size and shape, good uniformity, superior crystallinity of the product and relatively low reaction temperature.

However, it is not easy to grow a nanostructure of desired shape and size with orientation in general and use of a solid template is necessary. For control of oriented growth, various synthesis methods using templates such as porous alumina, polymer latex, silica and carbon, supermolecules, surfactant, organogel, etc. have been developed. However, use of a template is disadvantageous in that production cost and time are increased in addition to the inclusion of impurities. It is not easy to completely remove the template and the template often causes environmental problems and has a negative effect on the structure of the final product. Accordingly, development of a method capable of synthesizing novel iron oxide nanostructures via a fast and environment-friendly route without using a template is important.

In addition, a recent finding demonstrated that iron oxide nanoparticle can catalyze oxidations, similarly to natural peroxidase, giving rise to new possibilities in the field of enzyme mimics or artificial enzymes. Researches are actively carried out thereabout since the drawbacks of natural enzymes such as denaturation by proteases, requirement of special storage conditions and high cost can be resolved.

Shape of iron oxide nanoparticles is recognized as an important parameter influencing nanoparticle properties. Particularly, one-dimensional (1D) structures such as nanorod and nanowire possess unique properties that are different from their bulk materials and even the zero-dimensional counterparts (spherical nanocrystals). This is also seen in the recently developed peroxidase-mimicking nanoparticles where the peroxidase mimic activity of rod-shaped $Fe_3O_4$ dominates over the spheres which are much smaller in size. Accordingly, preparation of various iron oxide nanoparticles differing in physical parameters such as shape, size, surface area and dimensionality and studies on their effect on the enzyme mimic activity of the iron oxide nanoparticles are necessary.

SUMMARY

The present disclosure is directed to providing a method for preparing hematite iron oxides having peroxidase mimic activity and having various shapes, sizes and nanostructures and hematite iron oxides prepared thereby.

The present disclosure is also directed to providing a method for preparing hematite iron oxides having various nanostructures through a fast, environment-friendly and simple one-step synthesis route without using a template and hematite iron oxides prepared thereby.

In one general aspect, the present disclosure provides a method for preparing nanorod-shaped hematite iron oxide having peroxidase activity, including:

(a) preparing an akaganeite ($\beta$-FeOOH, iron oxide-hydroxide) nanorod by adding hydrochloric acid or caffeine to a solution of iron chloride in a mixture solvent of water and ethanol; and (b) performing hydrothermal synthesis at 200-300° C. for 1-3 hours using the akaganeite nanorod as a precursor.

In an exemplary embodiment of the present disclosure, the length of the nanorod-shaped hematite iron oxide may be controlled by controlling at least one selected from the concentration of the hydrochloric acid, the concentration of the caffeine and the volume ratio of the mixture solvent of water and ethanol. The concentration of the hydrochloric acid may be adjusted to 0.0005-0.2 M, the concentration of the caffeine may be adjusted to 0.005-0.03 M and the volume ratio of the mixture solvent of water and ethanol may be adjusted to 10:1-10.

In another exemplary embodiment of the present disclosure, the akaganeite nanorod is prepared at 80-120° C. if hydrochloric acid is used in the step (a) and it is prepared at 30-80° C. if caffeine is used.

The present disclosure also provides a nanorod-shaped hematite iron oxide prepared according to the above-described method and having peroxidase activity.

In an exemplary embodiment of the present disclosure, the nanorod-shaped hematite iron oxide may have pores with a diameter of 1-20 nm and the nanorod-shaped hematite iron oxide may have a diameter of 3-50 nm, a length of 25-400 nm and a BET surface area of 50-520 $m^2/g$.

In another general aspect, the present disclosure provides a method for preparing hexagonal prism-shaped hematite iron oxide having peroxidase activity, including:

(a) preparing an aqueous mixture solution of iron chloride and urea by adding iron chloride to urea dissolved in distilled water while stirring; and (b) performing hydrothermal synthesis at 80-100° C. for 8-14 hours.

In an exemplary embodiment of the present disclosure, the molar ratio of iron chloride and urea in the step (a) may be 1:5-10.

The present disclosure also provides a hexagonal prism-shaped hematite iron oxide prepared according to the above-described method and having peroxidase activity.

In an exemplary embodiment of the present disclosure, the hexagonal prism-shaped hematite iron oxide may have a size of 90-120 nm and a BET surface area of 35-200 $m^2/g$.

In another general aspect, the present disclosure provides a method for preparing cube-shaped hematite iron oxide having peroxidase activity, including:

(a) preparing an aqueous mixture solution of iron chloride and caffeine by adding iron chloride to caffeine dissolved in distilled water while stirring; and (b) performing hydrothermal synthesis at 80-100° C. for 20-24 hours.

In an exemplary embodiment of the present disclosure, the molar ratio of iron chloride and caffeine in the step (a) may be 1:0.005-2.

The present disclosure also provides a cube-shaped hematite iron oxide prepared according to the above-described method and having peroxidase activity.

In an exemplary embodiment of the present disclosure, the cube-shaped hematite iron oxide may have a size of 90-110 nm and a BET surface area of 40-210 $m^2/g$.

In another general aspect, the present disclosure provides a method for preparing hematite iron oxide, including:

(a) preparing a mixture solution by adding iron chloride and caffeine to a solvent and magnetically stirring; and (b) performing hydrothermal synthesis at 150-200° C. for 4-12 hours, wherein the solvent is selected from water, ethanol, propanol and methanol.

In an exemplary embodiment of the present disclosure, the shape of the hematite iron oxide may be controlled by adjusting the molar ratio of iron chloride and caffeine and varying the solvent in the step (a) and adjusting the hydrothermal synthesis time in the step (b).

In another exemplary embodiment of the present disclosure, the hematite iron oxide may have a shape of an urchin, hexagonal prism, spindle, rhombohedron, porous hollow sphere, ellipsoid, grape, dumbbell or sphere.

In another exemplary embodiment of the present disclosure, the molar ratio of iron chloride and caffeine may be 10-50:1.

The present disclosure also provides hematite iron oxide prepared according to the above-described method and consisting of multiple crystallites having orientation and formed by self-assembling aggregation.

In an exemplary embodiment of the present disclosure, the crystallites may have a diameter of 30-40 nm and the hematite iron oxide may have a diameter of 500-6000 nm and a BET surface area of 10-180 $m^2/g$.

In another exemplary embodiment of the present disclosure, the hematite iron oxide the hematite iron oxide may have a higher coercivity at room temperature (300 K) than at low temperature (5 K) and may have a coercivity of 0.25-1.10 T at 300 K.

In accordance with the present disclosure, hematite iron oxide ($\alpha$-$Fe_2O_3$) superstructures of various shapes, including grape, cube, dumbbell and microsphere shapes, can be synthesized in different solvents using caffeine. The shapes can be controlled variously via a simple one-step synthesis route without using a growth-inducing agent and without separation based on size. Interestingly, the prepared hematite iron oxide exhibits high coercivity at room temperature owing to its fine crystal structures and anisotropic shapes. The hematite iron oxide ($\alpha$-$Fe_2O_3$) nanoparticles having different nanostructures prepared according to the present disclosure may be widely useful in biological and biochemical applications as a material having peroxidase mimic activity and thus capable of replacing natural enzymes.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1A:
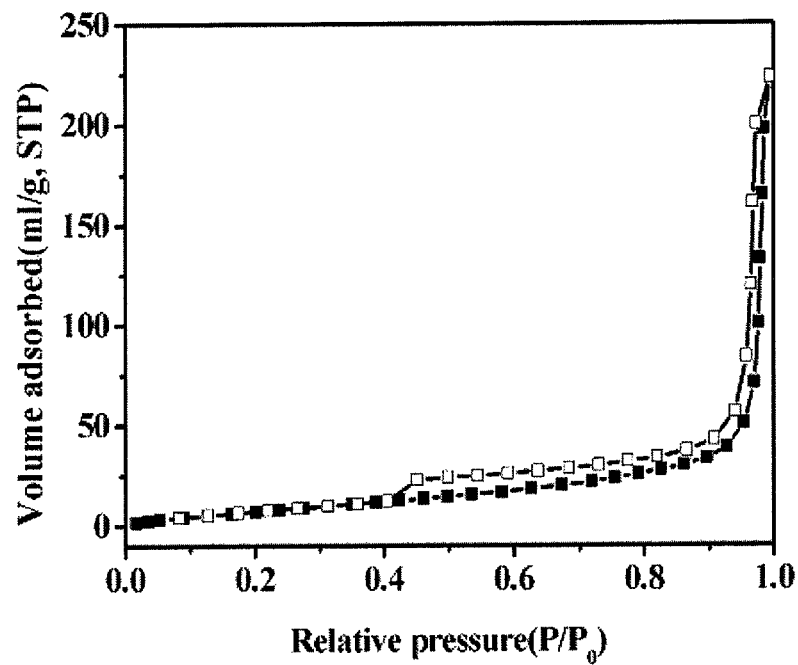
FIG. 1$a$ shows an $N_2$ adsorption-desorption isotherm of hexagonal prism-shaped $\alpha$-$Fe_2O_3$ prepared in Synthesis Example 1-(2), FIG. 1$b$ shows an $N_2$ adsorption-desorption isotherm of cube-shaped $\alpha$-$Fe_2O_3$ prepared in Synthesis Example 1-(3) and FIG. 1$c$ shows an $N_2$ adsorption-desorption isotherm of rod-shaped $\alpha$-$Fe_2O_3$ prepared in Synthesis Example 1-(1)

Hereinafter, exemplary embodiments will be described in detail with reference to the accompanying drawings.

In an aspect, the present disclosure provides a method for preparing hematite iron oxide ($\alpha$-$Fe_2O_3$) nanoparticles of various shapes (including hexagonal prism, sphere and rod) via a simple hydrothermal synthesis route without using a surfactant or other additives.

Since the preparation method according to the present disclosure yields hardly toxic, biocompatible iron oxide by environment-friendly synthesis, it is directly applicable to biological or biochemical applications. In particular, since shape, size and surface area can be controlled variously, various hematite iron oxide ($\alpha$-$Fe_2O_3$) nanoparticles exhibiting peroxidase mimic activity can be prepared according to the present disclosure.

Specifically, an akaganeite ($\beta$-FeOOH, iron oxide-hydroxide) nanorod is prepared by adding hydrochloric acid or caffeine to an iron chloride solution and then hydrothermal synthesis is performed using the akaganeite nanorod as a precursor. The length of synthesized nanorod-shaped hematite iron oxide is controlled by the concentration of the hydrochloric acid, the concentration of the caffeine or the volume ratio of water and alcohol in the solution.

Also, an aqueous mixture solution of iron chloride and urea is prepared by adding iron chloride to urea dissolved in distilled water while stirring and then hydrothermal synthesis is performed to prepare hexagonal prism-shaped hematite iron oxide.

Further, an aqueous mixture solution of iron chloride and caffeine is prepared by adding iron chloride to caffeine, instead of hydrochloric acid or urea as a reducing agent, dissolved in distilled water while stirring and then single-step hydrothermal synthesis is performed to prepare cube-shaped hematite iron oxide.

In the following examples, the effect of surface area on enzyme mimic activity of hematite iron oxide of various shapes will be described. In particular, the influence of porosity, pore shape, etc. in addition to surface area on the enzyme mimic activity of rod-shaped hematite iron oxide will be described in detail.

In another aspect, the present disclosure provides a method for preparing hematite iron oxide ($\alpha$-$Fe_2O_3$) superstructures of various shapes, including grape, cube, dumbbell and microsphere, using caffeine in the presence of different solvents by environmentally benign one-step hydrothermal synthesis.

In accordance with this method, hematite superstructures are formed by self-assembling aggregation of small particles of a few nanometers in size and the structural and magnetic properties of the finally formed iron oxide nanostructures can be effectively altered by controlling synthesis conditions such as the molar ratio of caffeine, solvents used, concentrations, reaction time, etc.

In particular, the solvent plays a key role for overall architecture of the oxide particles under different polar conditions. Interestingly, magnetic hysteresis measurements reveal that the $\alpha$-$Fe_2O_3$ superstructures prepared according to the present disclosure have much higher coercivity values at room temperature than those at lower temperature.

Specifically, a mixture solution is prepared by adding iron chloride and caffeine to a solvent and magnetically stirring and then hydrothermal synthesis is performed. The solvent is selected from water, ethanol, propanol and methanol. Hematite iron oxide of various shapes can be prepared by adjusting the molar ratio of iron chloride and caffeine, varying the solvent used and adjusting the hydrothermal synthesis time.

EXAMPLES

Hereinafter, the present disclosure will be described in further detail through examples. However, the following examples are for illustrative purposes only and those of ordinary skill in the art will appreciate that the scope of this disclosure is not limited thereto and various modifications and changes can be made thereto without departing from the scope of the present disclosure.

Iron chloride ($FeCl_3 \cdot 6H_2O$, AR grade, purity=98%), urea (($NH_2$)$_2$CO), caffeine, citric acid, sodium hydrogen phosphate ($Na_2HPO_4$) and dimethyl sulfoxide (DMSO) were purchased from Sigma-Aldrich and used without any further purification. A stable, chromogenic and non-carcinogenic horseradish peroxidase (HRP) substrate, 3,3',5,5'-tetramethylbenzidine (TMB) was also purchased from Sigma-Aldrich and hydrogen peroxide ($H_2O_2$) was purchased from Samchun Chemical (Korea).

Synthesis Example 1

Synthesis of Hematite Iron Oxide ($\alpha$-$Fe_2O_3$) Nanostructures $\alpha$-$Fe_2O_3$ nanoparticles with different structures (hexagonal prism-shaped, cube-shaped and rod-shaped) were synthesized through hydrolysis of iron chloride ($FeCl_3 \cdot 6H_2O$) by a hydrothermal method.

(1) Synthesis of Nanorod-Shaped Hematite Iron Oxide ($\alpha$-$Fe_2O_3$)

A 0.02 M iron chloride solution was prepared in deionized water or a mixture solvent of water and ethanol (1:0.1-1, v/v) preheated to 90° C. After a predetermined time, varying concentrations of hydrochloric acid (HCl) or caffeine were added to form $\beta$-FeOOH nanorods of different sizes. The respective flasks were magnetically stirred at 35-90° C. for 10-24 hours, culminating into yellow-colored mixtures. Thus obtained yellow mixtures in which the $\beta$-FeOOH nanorods were formed were cooled to room temperature, centrifuged, washed repeatedly with deionized water and ethanol and then dried overnight in an oven at 80° C. The as-synthesized $\beta$-FeOOH nanorods were used as precursors for various $\alpha$-$Fe_2O_3$ nanorods.

The $\beta$-FeOOH nanorods were slowly heated at a rate of 2° C./min up to 250° C. and maintained for 2 hours under static conditions. Through this procedure, the precursors were transformed to brown-colored hematite $\alpha$-$Fe_2O_3$ nanorods. After the transformation, the shape and size of the $\beta$-FeOOH were maintained in the resulting $\alpha$-$Fe_2O_3$ nanorods. The resultant nanorods had different lengths depending on the hydrochloric acid and caffeine concentrations and polarity of the solvent used during the synthesis procedure. They were labeled R-1, R-2 and R-3 according to their length.

(2) Synthesis of Hexagonal Prism-Shaped Hematite Iron Oxide ($\alpha$-$Fe_2O_3$)

Hexagonal prism-shaped $\alpha$-$Fe_2O_3$ was synthesized using urea as a reducing agent. A predetermined amount of urea was dissolved in deionized water preheated to 90° C. with vigorous stirring and iron chloride was added. The molar ratio of iron chloride to urea was 1:10. Upon addition of iron chloride, the color of the solution changed to brown. The solution was stirred for 12 hours at the same temperature and the resulting nanostructures were isolated by centrifugation with repeated washing.

(3) Synthesis of Cube-Shaped Hematite Iron Oxide ($\alpha$-$Fe_2O_3$)

Cube-shaped $\alpha$-$Fe_2O_3$ nanoparticles were synthesized using 0.06 mol of iron chloride ($FeCl_3.6H_2O$) and 0.03 mol of caffeine instead of hydrochloric acid or urea in aqueous solution. A flask holding the solution was magnetically stirred at 90° C. for 24 hours. The resulting mixture was allowed to cool naturally to room temperature and the resultant brown product containing hematite was isolated through centrifugation, washed repeatedly with deionized water and ethanol and dried overnight at 80° C.

Synthesis Example 2

Synthesis of Hematite Iron Oxide ($\alpha$-$Fe_2O_3$) Nanostructures

Hematite iron oxide ($\alpha$-$Fe_2O_3$) was synthesized by a hydrothermal method using caffeine as a capping agent.

(1) Synthesis of Cube-Shaped Hematite Iron Oxide ($\alpha$-$Fe_2O_3$)

10 mmol of $FeCl_3.6H_2O$ and 0.5 mmol of caffeine were added to 100 mL of deionized water and dissolved by magnetically stirring at room temperature. Thus obtained yellow-colored clear solution was transferred to a Teflon-lined 350-mL stainless steel autoclave. After sealing, the autoclave was heated at a rate of 3.5° C./min up to 180° C. and maintained at the temperature for 10 hours. After cooling to room temperature, the resulting reddish brown product was isolated by centrifugation and washed repeatedly with deionized water and anhydrous ethanol to remove any remaining impurities. Finally, the product was dried overnight in the air at 80° C. to prepare cube-shaped hematite iron oxide (hereinafter, also called SW).

(2) Synthesis of Grape-Shaped Hematite Iron Oxide ($\alpha$-$Fe_2O_3$)

Grape-shaped hematite iron oxide (hereinafter, also called SE) was prepared according to the same procedure as Synthesis Example 1-(1), except for using ethanol instead of water as a solvent.

(3) Synthesis of Dumbbell-Shaped Hematite Iron Oxide ($\alpha$-$Fe_2O_3$)

Dumbbell-shaped hematite iron oxide (hereinafter, also called SP) was prepared according to the same procedure as Synthesis Example 1-(1), except for using propanol instead of water as a solvent and using 20 mmol of iron chloride.

(4) Synthesis of Microsphere-Shaped Hematite Iron Oxide ($\alpha$-$Fe_2O_3$)

Microsphere-shaped hematite iron oxide (hereinafter, also called SM) was prepared according to the same procedure as Synthesis Example 1-(1), except for using methanol instead of water as a solvent and using 20 mmol of iron chloride.

The synthesis conditions of Synthesis Examples 2-(1) to 2-(4) are summarized in [Table 1].

TABLE 1

Test Example 1. Characterization of hematite iron oxide nanostructures prepared in Synthesis Example 1

| | | Reactants (mmol) | | |
| --- | --- | --- | --- | --- |
| | Solvents | $FeCl_3 \cdot 6H_2O$ | Caffeine | Shape |
| Synthesis Example 2-(1) | Water | 10 | 0.5 | Cube |
| Synthesis Example 2-(2) | Ethanol | 10 | 0.5 | Grape |
| Synthesis Example 2-(3) | Propanol | 20 | 0.5 | Dumbbell |
| Synthesis Example 2-(4) | Methanol | 20 | 0.5 | Microsphere |

(1) The microscopic features of the synthesized $\alpha$-$Fe_2O_3$ nanostructures were elucidated using a transmission electron microscope (TEM, EM 912 Omega, operation voltage: 120 kV) and a scanning electron microscope (SEM, LEO 1455VP, Hitachi S-4700, acceleration voltage: 25 kV).

X-ray diffraction (XRD) patterns were obtained with a Rigaku 1200 diffractometer with CuKa radiation using a Ni $\beta$-filter at a scan rate of 4°/min. The X-ray source was operated at 40 kV and 30 mA.

Biocatalytic and enzyme mimic activities of iron oxide nanoparticles are generally known to be related with surface characteristics. Hence, surface area is an important aspect for analyzing the enzyme mimic activity of biocatalytic nanomaterials. $N_2$ adsorption-desorption test was conducted at 77 K using a KICT SPA-3000 gas adsorption analyzer after the test materials were degassed at 423 K to 20 μTorr for 12 hours. Surface area of the test materials was calculated from the nitrogen isotherms in a relative pressure from 0.05 to 0.2 using the Brunauer-Emmett-Teller (BET) equation. Total pore volume was determined from the amount of gas adsorbed at a relative pressure of 0.99.

(2) Peroxidase mimic activity of $\alpha$-$Fe_2O_3$ nanostructures

A. Determination of Optimal Concentration

The minimum $\alpha$-$Fe_2O_3$ nanoparticle concentration which showed maximal peroxidase enzyme mimic activity was determined. Various concentrations of $\alpha$-$Fe_2O_3$ were tested with increasing concentrations of the peroxidase substrate TMB in citrate buffer (pH 4). 3.0 mM of $\alpha$-$Fe_2O_3$ was chosen as an optimal concentration at which the peroxidase mimic activity of hexagonal prism-shaped, sphere-shaped and rod-shaped nanoparticles becomes maximal.

B. Kinetic Assay of α-Fe₂O₃ Nanoparticles

It is well known that horseradish peroxidase (HRP) catalyzes oxidation of its substrate, thus resulting in color change. This reaction can be normally quenched by adding sulfuric acid and, hence, measurement of absorbance and further analysis are possible. The peroxidase mimic activity of the hexagonal prism-shaped, sphere-shaped and rod-shaped nanoparticles was measured by a steady state kinetic assay. TMB was used as a substrate. A clear and transparent stock solution was prepared by dissolving powdered TMB in DMSO. Then, TMB solutions of various concentrations were obtained through serial dilution of the stock solution using citrate buffer of pH 4. For all the experiments, a fresh buffer was prepared for use. All the reactions were carried out in amber-colored 1.5-mL vials at 37° C. for 30 minutes. For steady state kinetic assay, 100 μL of the respective α-Fe₂O₃ nanoparticles were added to equal amounts of solutions containing different concentrations of TMB in citrate buffer. Reactions were initiated by adding 30% H₂O₂. The solutions were mixed well in each vial and then subjected to incubation. The reactions were quenched by adding 2.0 M sulfuric acid immediately after the incubation was over. The reaction vials were centrifuged for 30 seconds and 100 μL of the supernatant was transferred to a 96-well plate. Then, absorbance was recorded at 450 nm using a microtiter plate reader (EMax; Molecular Devices, USA). All the experiments were repeated three times for each nanoparticle to obtain reproducible results.

The related kinetic parameters were determined using the Michaelis-Menten equation.

$$v = V_{max}[S]/(K_m+[S])$$

where v is the initial rate of reaction, $V_{max}$ is the maximal rate of reaction, [S] is the substrate concentration and $K_m$ is the Michaelis-Menten constant.

(3) Structural Parameters of α-Fe₂O₃ Nanoparticles

A. The hexagonal prism-shaped nanoparticles had parallel and diagonal sides of 80-90 nm and 60-70 nm, respectively, and had width and thickness of 105-110 nm and 85-95 nm, respectively, on average. The sphere-shaped nanoparticles had an average size of 100 nm and the rod-shaped nanoparticles had a length of 250-400 nm and a diameter of 30-35 nm.

Figure 1B:
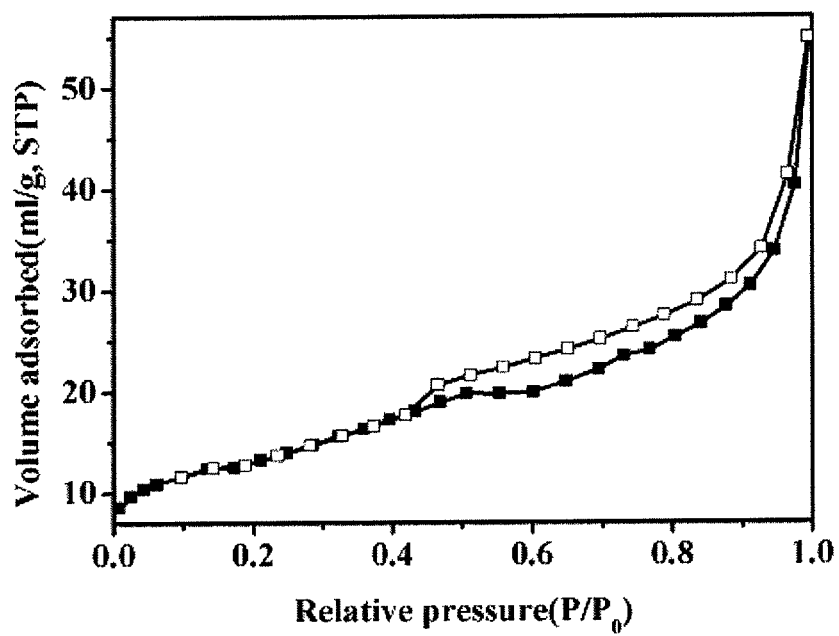
Figure 1C:
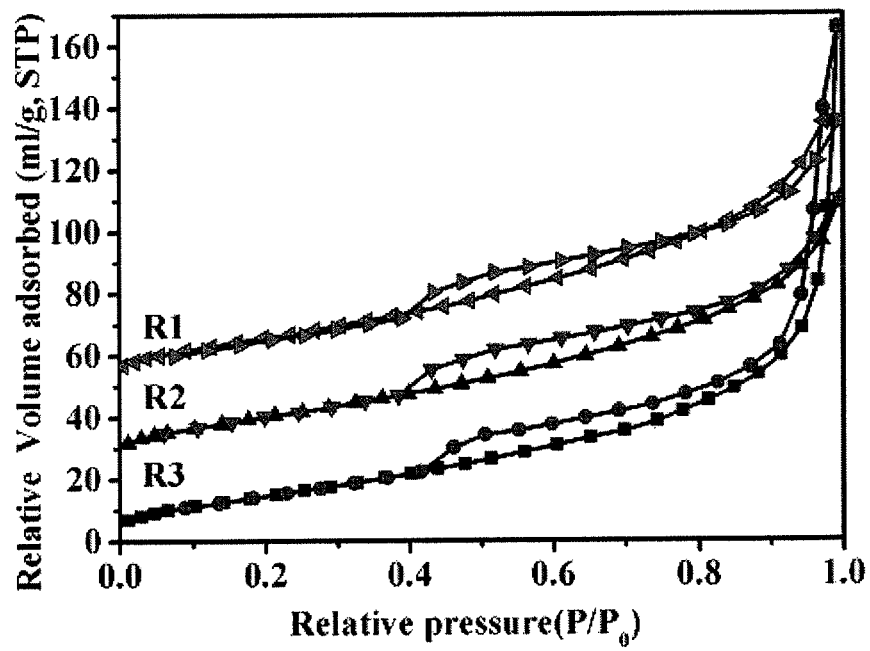
Figure 2A:
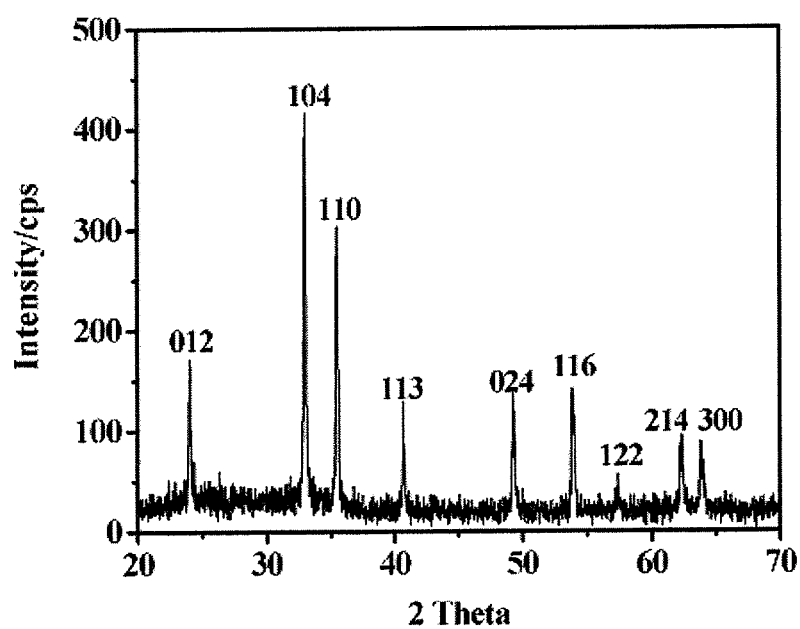
FIG. 2$a$ shows an XRD pattern of hexagonal prism-shaped $\alpha$-$Fe_2O_3$ prepared in Synthesis Example 1-(2), FIG. 2$b$ shows an XRD pattern of cube-shaped $\alpha$-$Fe_2O_3$ prepared in Synthesis Example 1-(3) and FIG. 2$c$ shows an XRD pattern of rod-shaped $\alpha$-$Fe_2O_3$ prepared in Synthesis Example 1-(1)
Figure 2B:
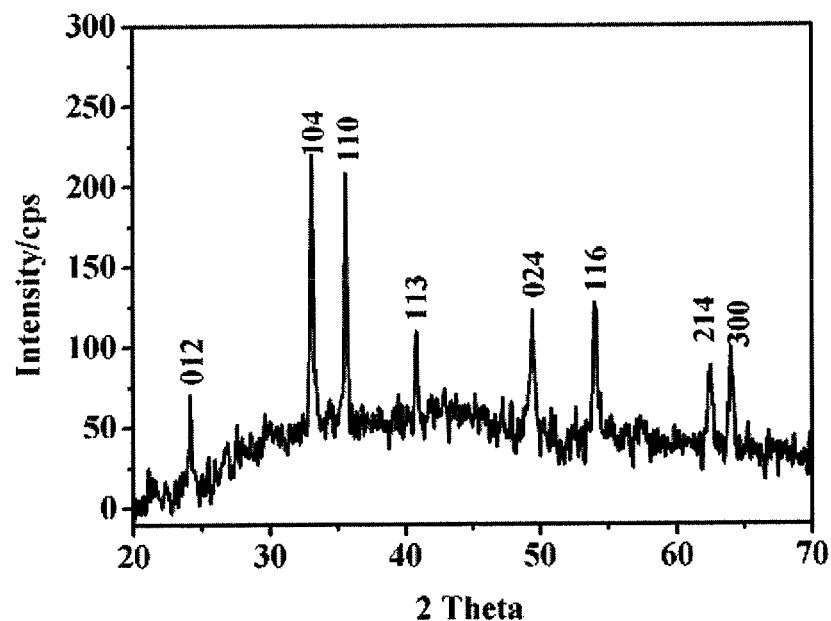
Figure 2C:
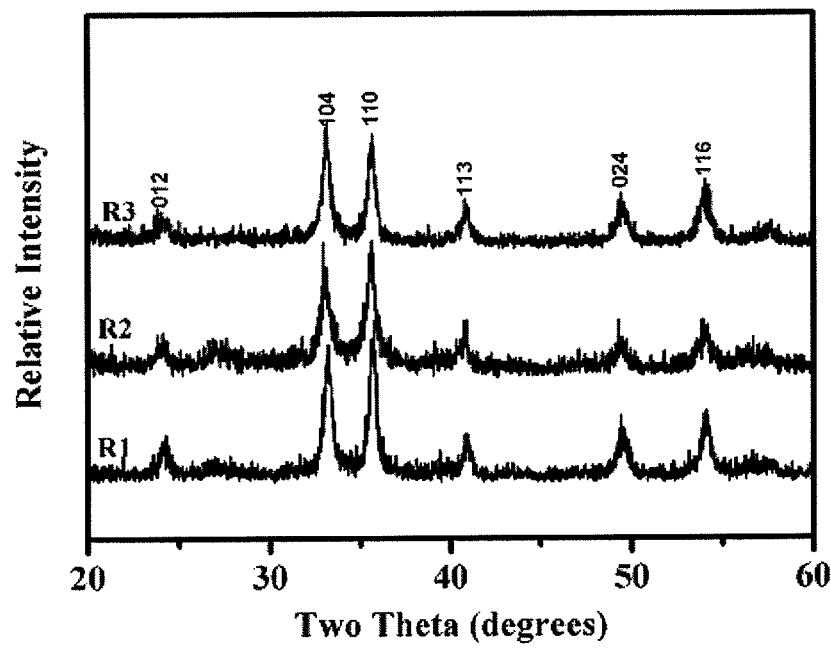

B. N₂ adsorption-desorption isotherms of the hexagonal prism-shaped, sphere-shaped and rod-shaped α-Fe₂O₃ are shown in FIGS. 1a-1c and surface area-related data are given in [Table 2]. And, XRD patterns are shown in FIGS. 2a-2c.

Despite the difference in shape, all the α-Fe₂O₃ nanostructures prepared in Synthesis Examples 1-(1) to 1-(3) showed similar XRD patterns, confirming that the synthesized iron oxide nanostructures correspond to the crystalline hematite α-Fe₂O₃ phase with lattice parameters a=5.037 Å and c=13.75 Å. And, all the reflection peaks were sharp and readily indexed to the pure rhombohedral phase of α-Fe₂O₃, suggesting that the particles are highly crystalline. The particles were in pure state since no impurity peak was observed.

Figure 3A:
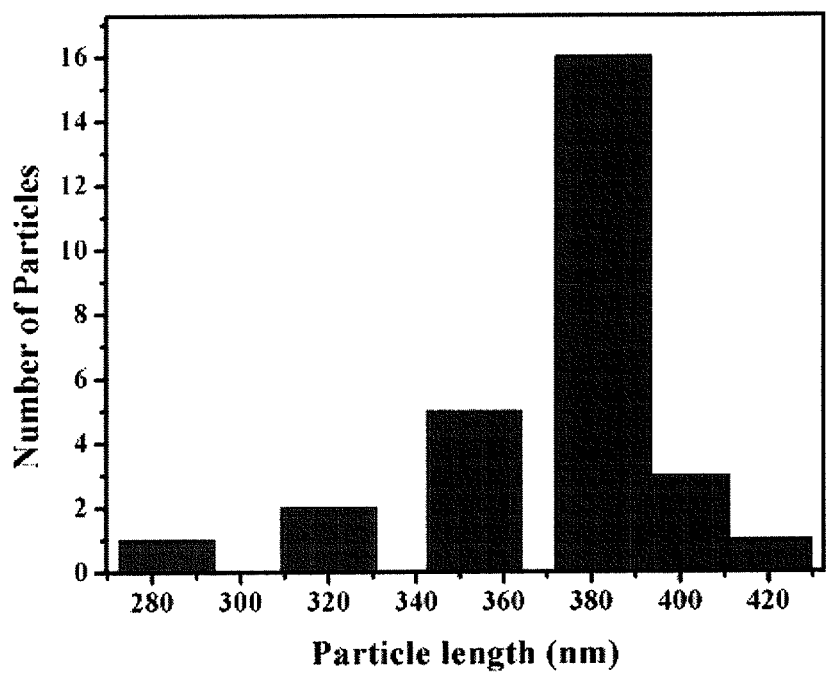
FIGS. 3$a$-3$c$ show a length distribution of R-1, R-2 and R-3 prepared in Synthesis Example 1-(1)
Figure 3B:
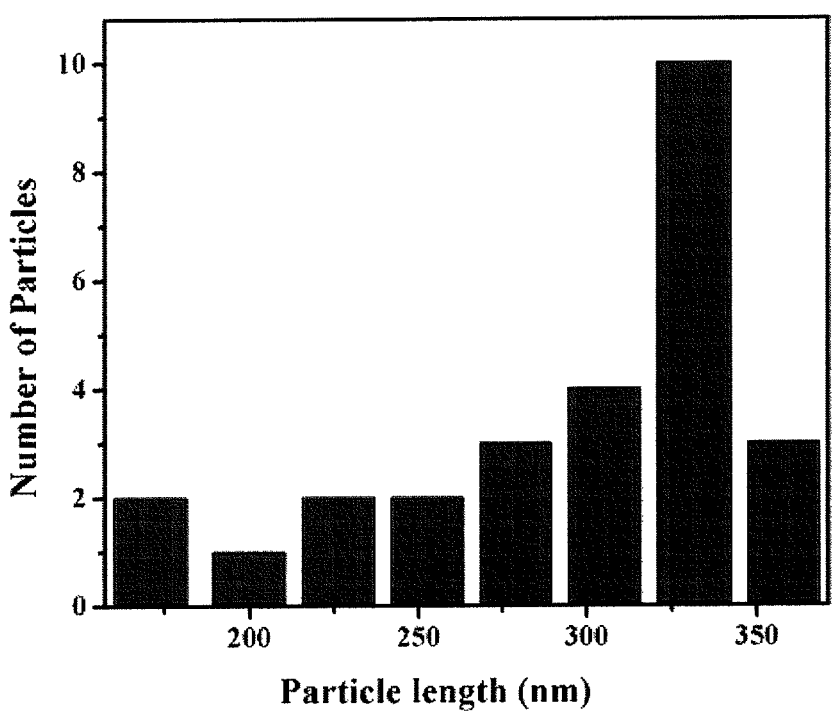
Figure 3C:
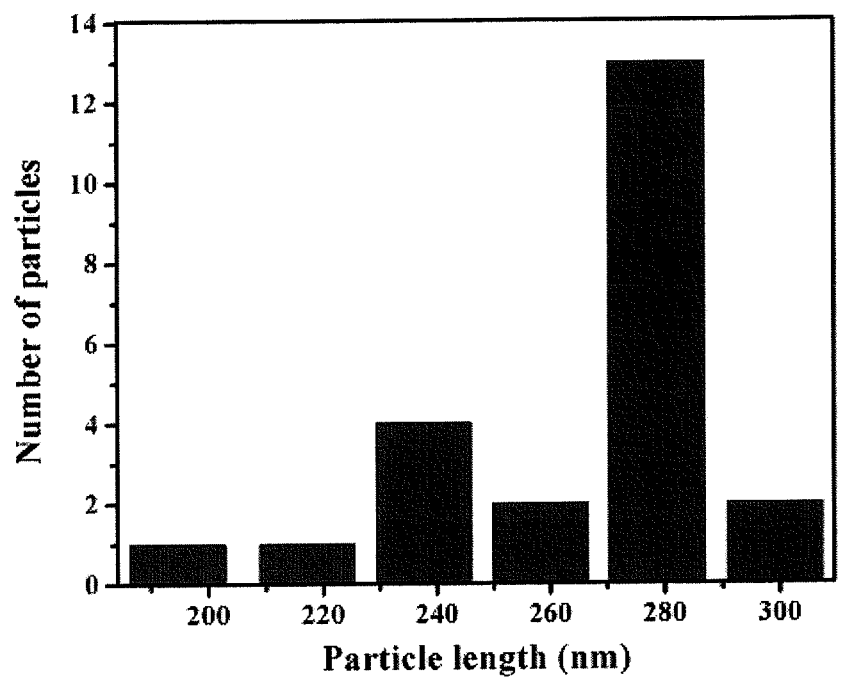

C. Length distribution was estimated by measuring length of the particles from randomly selected regions of TEM images. The distribution curves of R-1, R-2 and R-3 prepared in Synthesis Example 1-(1) are shown in FIGS. 3a-3c. And, average length of the hematite iron oxide prepared in Synthesis Examples 1-(1) to 1-(3) is given in [Table 2].

TABLE 2

| | Shape | Size (nm) | Surface area (m²/g) |
|---|---|---|---|
| Synthesis Example 1-(2) | Hexagonal prism | 110 ± 10 | 43 ± 4 |
| Synthesis Example 1-(3) | Cube | 100 ± 7 | 47 ± 5 |
| Synthesis Example 1-(1), R-1 | Rod | 31 ± 5 380 ± 20 | 55 ± 5 |
| Synthesis Example 1-(1), R-2 | Rod | 30 ± 3 330 ± 20 | 82 ± 8 |
| Synthesis Example 1-(1), R-3 | Rod | 30 ± 3 278 ± 20 | 111 ± 10 |

(4) Peroxidase Mimic Activity Analysis by Steady State Kinetic Assay of α-Fe₂O₃ nanoparticles A correlation between various physical parameters such as shape, size and surface area and their influence on peroxidase mimic activity of α-Fe₂O₃ nanoparticles were assessed.

The enzyme mimic activity of α-Fe₂O₃ originates from the ferrous ions present on the surface of the nanoparticles. The ferrous ions interact with the substrate in the presence of peroxide, resulting in a colored reaction product. The mechanism follows Fenton's reaction as follows.

$$Fe^{2+} + H_2O_2 \rightarrow Fe^{3+} + OH\cdot + OH^- \quad (1)$$

$$Fe^{3+} + H_2O_2 \rightarrow Fe^{2+} + OOH\cdot + H+ \quad (2)$$

Figure 4A:
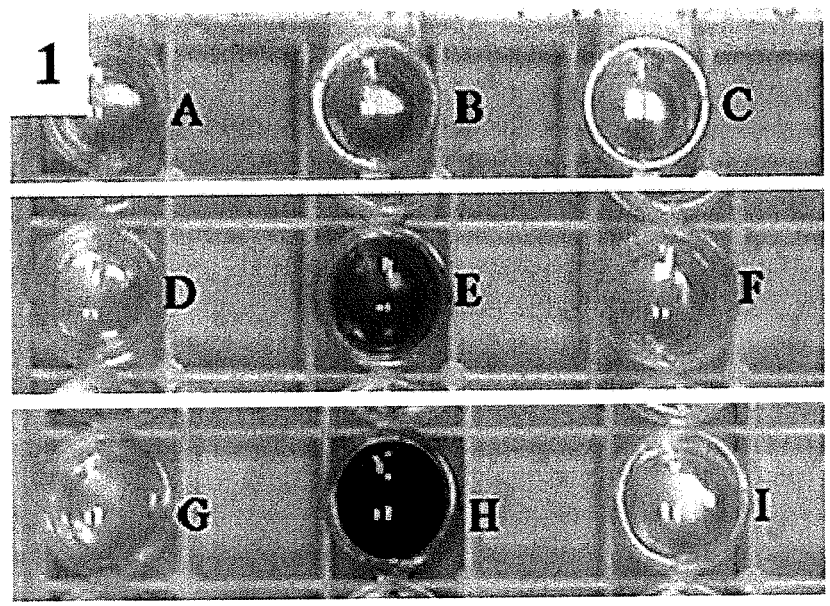
FIGS. 4$a$-4$b$ show images showing that $\alpha$-$Fe_2O_3$ nanoparticles prepared in Synthesis Example 1 exhibit peroxidase activity by catalyzing reaction of TMB, a substrate of peroxidase, in the presence of $H_2O_2$.

The hydroxyl radical (OH.) formed in the step (1) catalyzes oxidation of the TMB substrate, resulting in a colored product. All the three differently shaped α-Fe₂O₃ nanoparticles were found to catalyze the reaction with the peroxidase substrate TMB in the presence of H₂O₂ and produce a blue-colored product with maximum absorbance at 652 nm (see FIG. 4a).

Figure 4B:
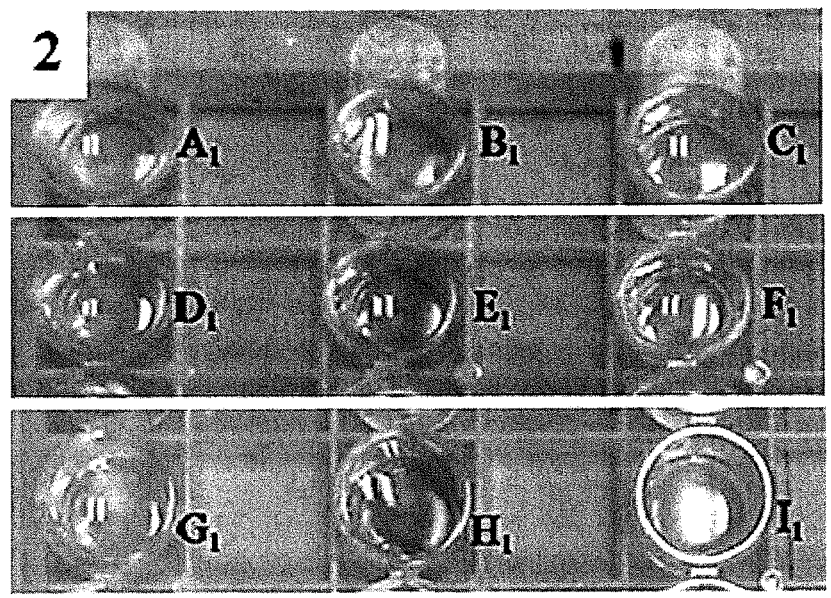

When the reaction was stopped by adding 2.0 M sulfuric acid, the blue product turned yellow immediately (see FIG. 4b). The yellow product was measured using a microtiter plate reader at a maximum absorbance of 450 nm. After measuring the absorbance of the respective nanoparticles, $V_{max}$ and $K_m$ values were determined using the SigmaPlot® 10.0 software. Michaelis-Menten plots and Lineweaver-Burk plots were drawn for the nanomaterials and the catalyst $K_{cat}$ was calculated using equation (3).

$$K_{cat} = V_{max}[E] \quad (3)$$

where [E] is the nanoparticle concentration.

Figure 5A:
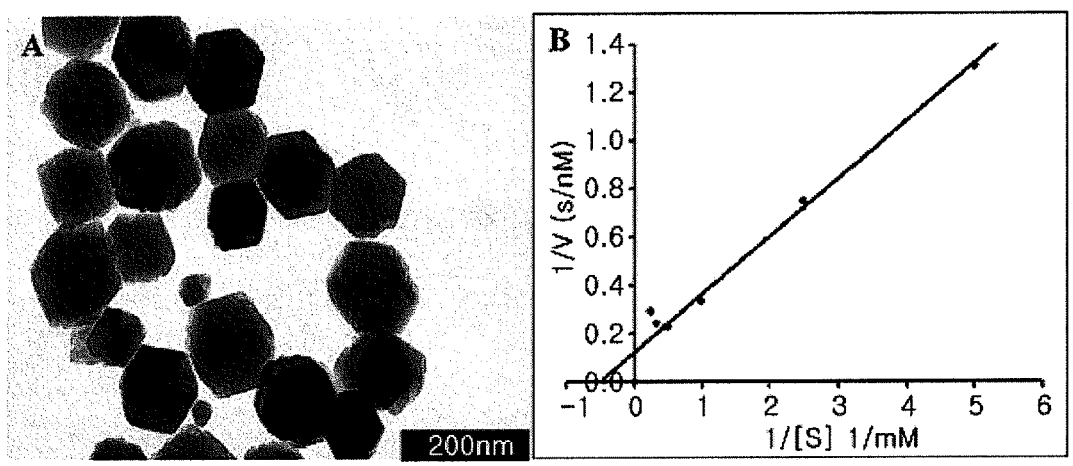
FIGS. 5$a$-5$c$ show transmission electron microscopic (TEM) images and Lineweaver-Burk plots of three types of nanoparticles prepared in Synthesis Example 1.
Figure 5B:
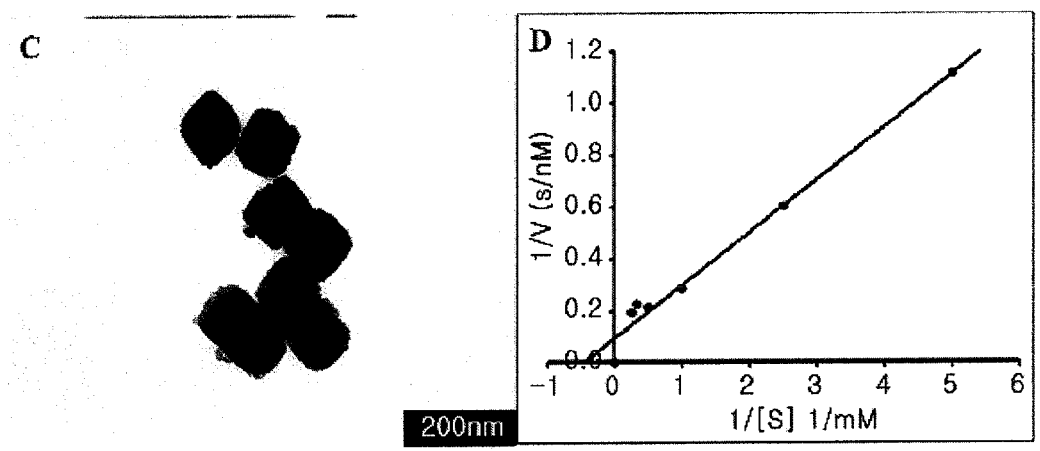
Figure 5C:
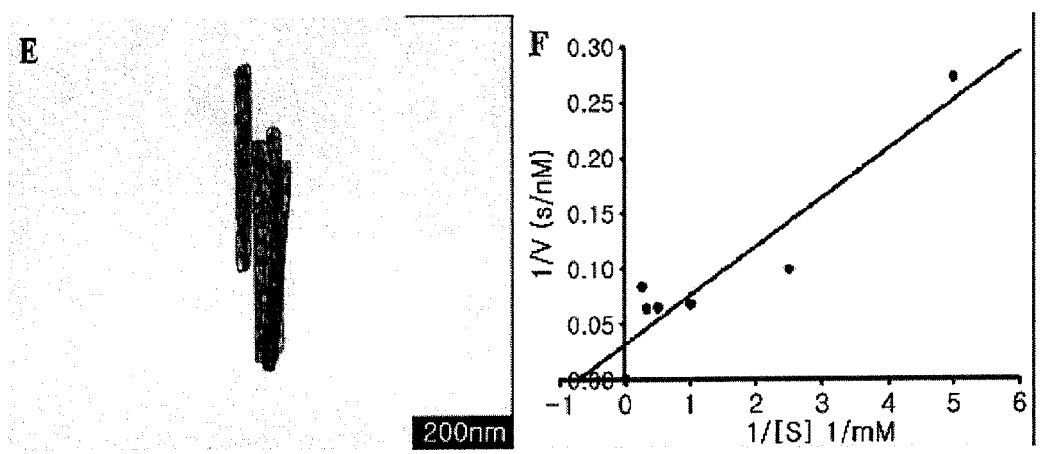
Figure 6A:
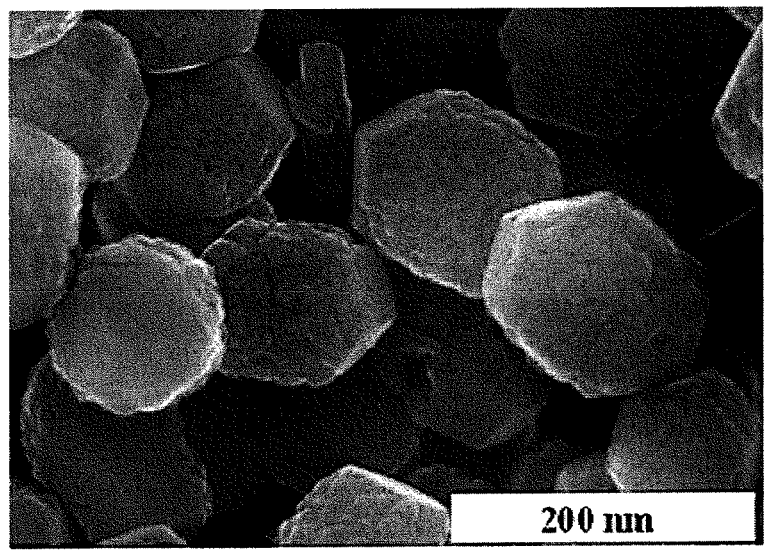
FIGS. 6$a$-6$b$ show scanning electron microscopic (SEM) images of hexagonal prism-shaped and cube-shaped $\alpha$-$Fe_2O_3$ prepared in Synthesis Example 1.
Figure 6B:
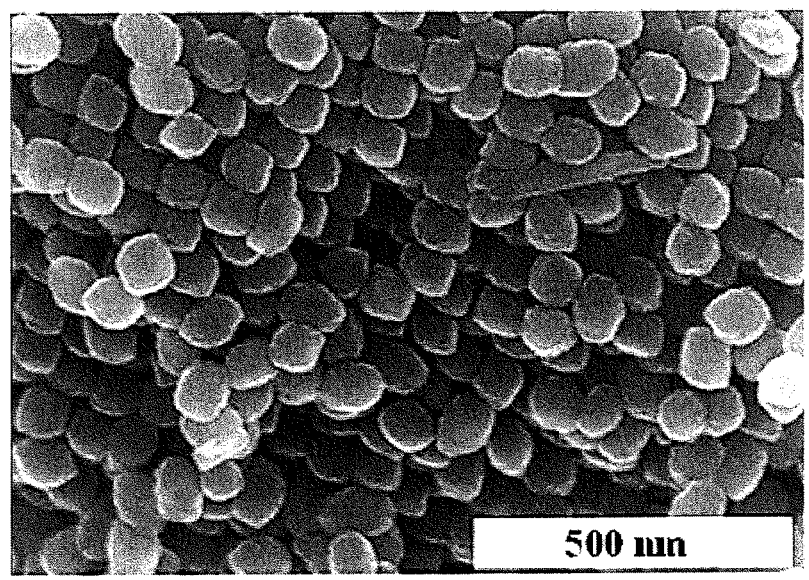

The TEM images and Lineweaver-Burk plots of the three differently shaped nanoparticles are shown in FIGS. 5a-5c. And, the SEM images of the hexagonal prism-shaped and cube-shaped α-Fe₂O₃ are shown in FIGS. 6a-6b. The $V_{max}$ value increased from hexagonal prism (5.0±0.44 nM/s, see FIG. 5a) through sphere (6.3±0.35 nM/s, see FIG. 5b) to rod-shaped (R-1, see FIG. 5c), with the highest maximal reaction rate of 16.5±2.1 nM/s. On the other hand, the lowest $K_m$ value was shown by rod (0.257±0.089 mM), followed by hexagonal prism (0.768±0.091 mM) and sphere (0.957±0.085 mM).

For natural enzymes, $V_{max}$ and $K_m$ values are indicators of maximal reaction rate (i.e. the reaction rate when an enzyme is saturated with its substrate) and affinity (the ability of the enzyme to bind with the substrate; The lower the $K_m$ value, the greater the affinity.).

When these two parameters related with enzyme activity were calculated for the three types of α-Fe₂O₃ nanoparticles, it was seen that the $V_{max}$ value increased with increase in surface area. Since the surface area increases from hexagonal prism to rod via sphere, the $V_{max}$ value also increased in this order, with the highest value for rod and the lowest value for hexagonal prism. That is to say, a clear correlation between the maximal reaction rate and the surface area was conformed and the $K_m$ value showed an inverse relationship with the surface area. However, the sphere-shaped nanoparticles showed slightly higher activity. From these results, it can be concluded that the peroxidase mimic activity of the three types of $\alpha$-$Fe_2O_3$ nanoparticles is mainly influenced by their surface area.

Figure 7:
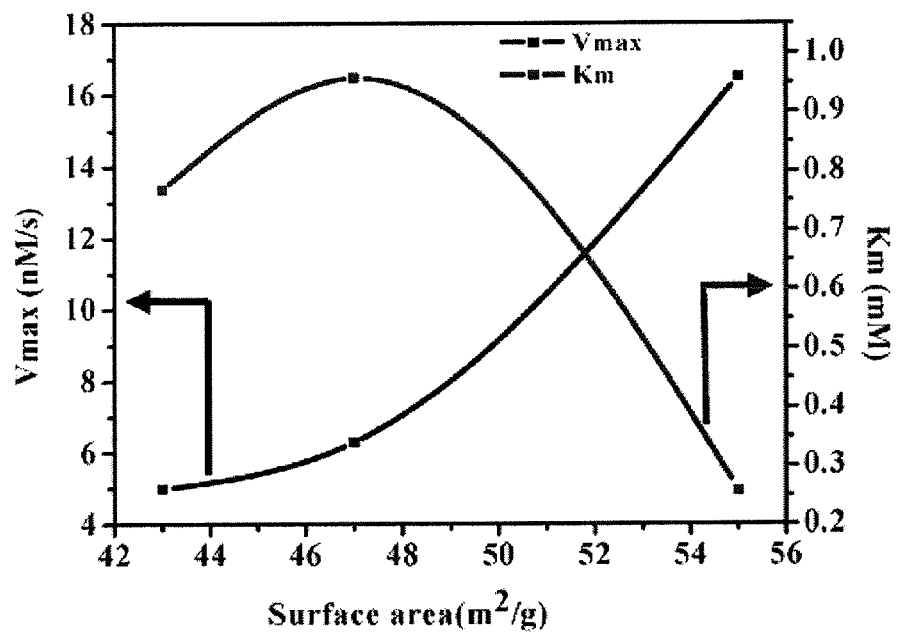
FIG. 7 shows $K_m$ and $V_{max}$ values of hexagonal prism-shaped, cube-shaped and nanorod-shaped $\alpha$-$Fe_2O_3$ prepared in Synthesis Example 1 as a function of surface area.

FIG. 7 shows the $K_m$ and $V_{max}$ values plotted as functions of surface area. The $V_{max}$, $K_m$ and $K_{lat}$ values of the respective nanoparticles are given in [Table 3]. A correlation between the shape, size, surface area and the kinetic parameters representing enzyme mimic activity can be confirmed.

TABLE 3

|  | Shape | $K_m$ (mM) | $V_{max}$ (nM/s) | $K_{cat}$ (s$^{-1}$) |
| --- | --- | --- | --- | --- |
| Synthesis Example 1-(2) | Hexagonal prism | 0.768 ± 0.091 | 5 ± 0.44 | 1.66 |
| Synthesis Example 1-(3) | Cube | 0.957 ± 0.085 | 6.3 ± 0.35 | 2.2 |
| Synthesis Example 1-(1), R-1 | Rod | 0.257 ± 0.089 | 16.5 ± 2.1 | 5.5 |
| Synthesis Example 1-(1), R-2 | Rod | 0.317 ± 0.071 | 15.3 ± 1.81 | 5.1 |
| Synthesis Example 1-(1), R-3 | Rod | 0.518 ± 0.047 | 10.60 ± 1.38 | 3.53 |

(5) Peroxidase Mimic Activity Analysis of $\alpha$-$Fe_2O_3$ Nanoparticles

A sound correlation was observed between the enzyme mimic activity and the surface area of the nanoparticles as described above. However, the difference in surface area of the rod-shaped nanoparticles when compared with the hexagonal prism-shaped and sphere-shaped nanoparticles is not sufficient to explain the exceptionally high activity of the rod-shaped nanoparticles, which is 2-3 times larger than those of the sphere-shaped and hexagonal prism-shaped nanoparticles. Thus, the effect of factors other than surface area was investigated.

In addition to R-1, two more rod-shaped nanoparticles (R-2 and R-3) having different surface areas and slight variations in length were investigated. These three types of rod-shaped nanoparticles varied between 250 and 400 nm in length and between 30 and 35 nm in diameter. The surface area increased in the order of R-1 (55±5 m$^2$/g)<R-2 (82±8 m$^2$/g)<R-3 (111±10 m$^2$/g), with R-3 having the largest surface area and R-1 having the smallest surface area. In order to measure the catalytic activity of R-2 and R-3 for the peroxidase substrate TMB, similar experiments were carried out as that for R-1.

Figure 8A:
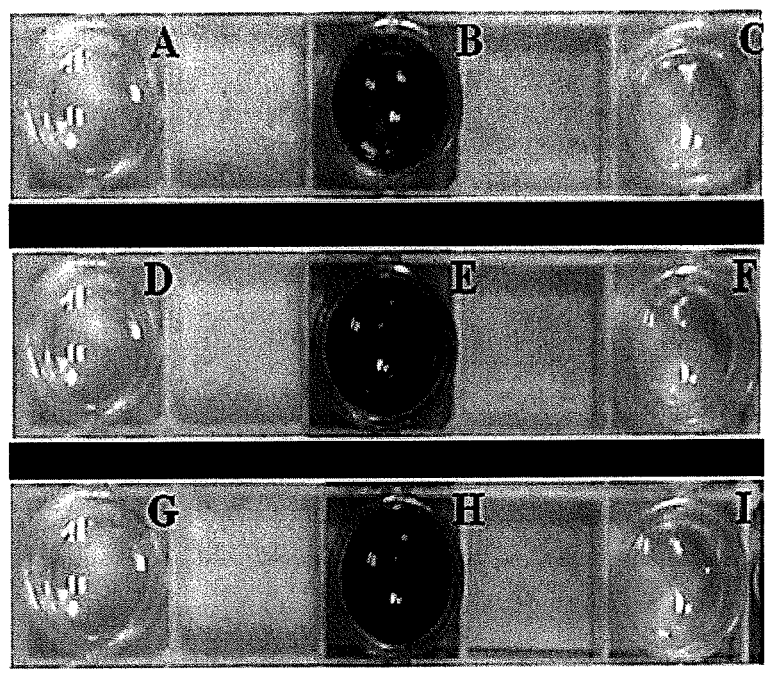
FIGS. 8$a$-8$b$ show images showing that three nanorod-shaped $\alpha$-$Fe_2O_3$ nanoparticles prepared in Synthesis Example 1-(1) exhibit peroxidase activity by catalyzing reaction of TMB, a substrate of peroxidase, in the presence of $H_2O_2$.
Figure 8B:
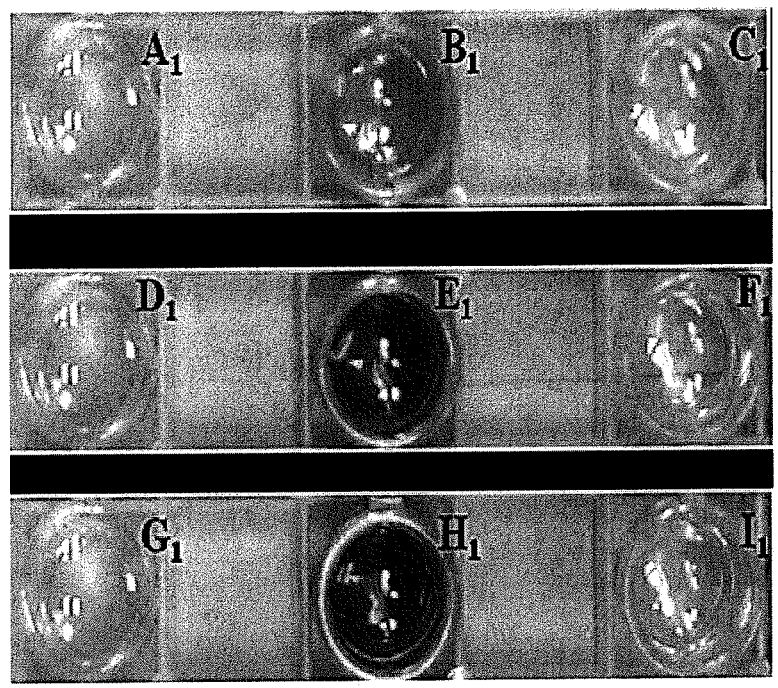
Figure 9A:
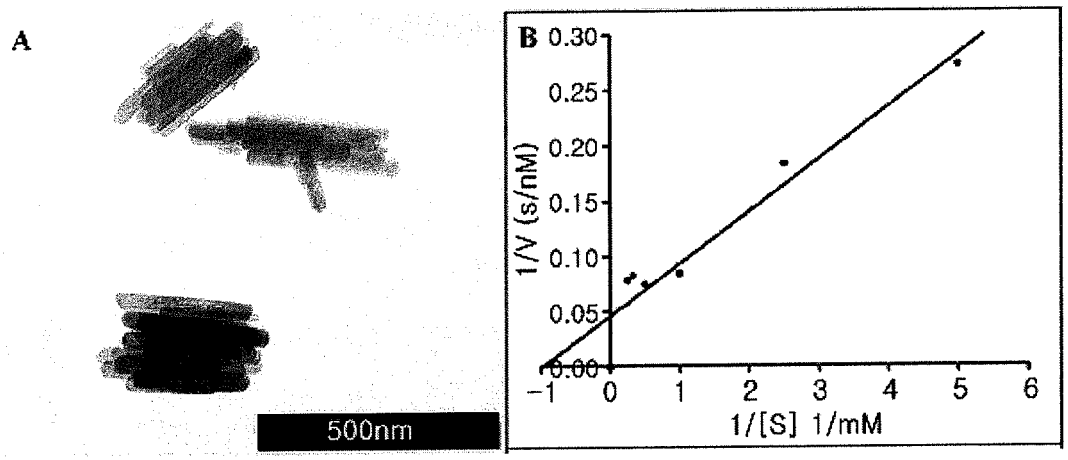
FIGS. 9$a$-9$c$ show TEM images and Lineweaver-Burk plots of three nanorod-shaped $\alpha$-$Fe_2O_3$ nanoparticles prepared in Synthesis Example 1-(1)
Figure 9B:
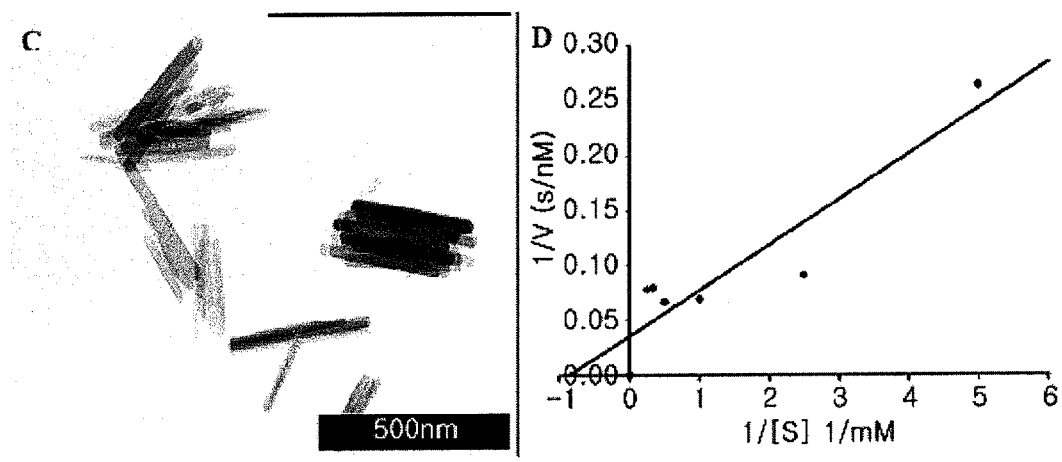
Figure 9C:
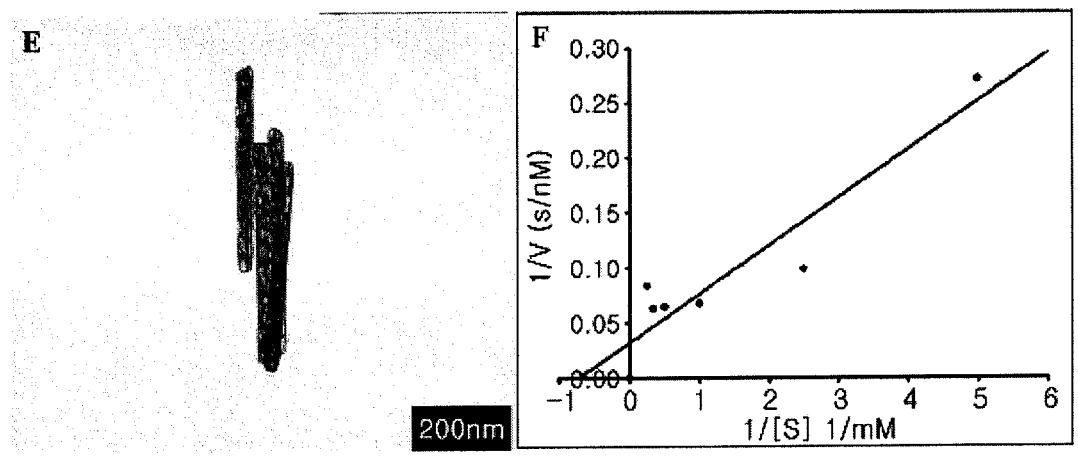
Figure 10:
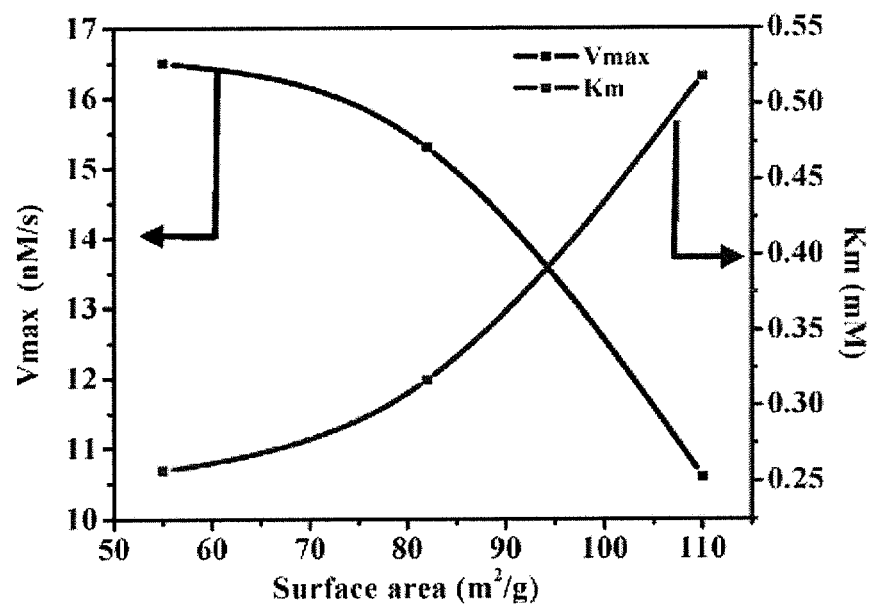
FIG. 10 shows a correlation between $V_{max}$ and $K_m$ values of three nanorod-shaped $\alpha$-$Fe_2O_3$ nanoparticles prepared in Synthesis Example 1-(1) and surface area.

FIGS. 8a-8b show the peroxidase mimic activity of the three types of rod-shaped nanoparticles. TEM images and Lineweaver-Burk plots are shown in FIGS. 9a-9c. The $V_{max}$ value of R-1, R-2 and R-3 was in the order of R-1>R-2>R-3, while the $K_m$ value displayed a reverse trend, i.e. R-1<R-2<R-3, with R-1 having the highest enzyme mimic activity, followed by R-2 and R-3. This shows that the $V_{max}$ and $K_{cat}$ values of the rod-shaped nanoparticles increase as the $K_m$ value and surface area decrease. The correlation of the $V_{max}$ and $K_m$ values with the surface area is shown in FIG. 10. This deviates from the earlier results where the peroxidase mimic activity was mainly governed by the surface area of the nanoparticles. The rod-shaped nanoparticles having smaller surface area (R-1 and R-2) showed better peroxidase mimic activity than the nanoparticles having larger surface area (R-3). This suggests that other physical properties such as porosity and pore shape which had not been considered may affect the catalytic activity to some extent.

Figure 11:
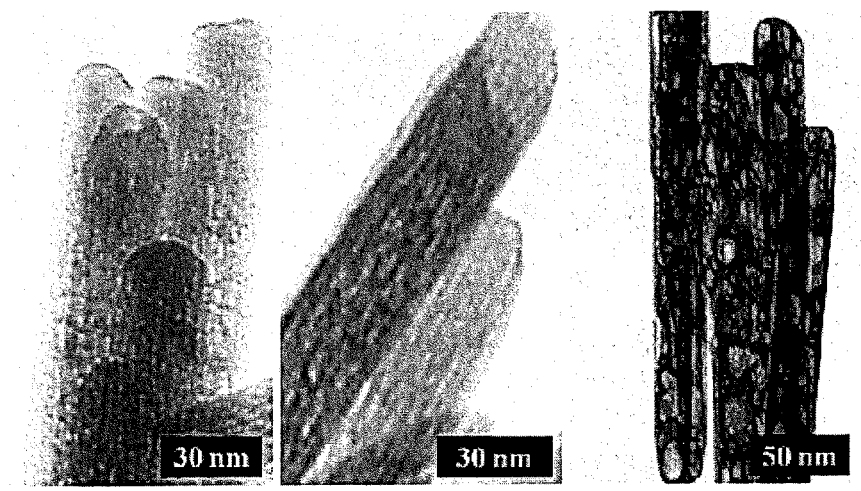
FIG. 11 shows enlarged TEM images of three nanorod-shaped $\alpha$-$Fe_2O_3$ nanoparticles prepared in Synthesis Example 1-(1)

FIG. 11 shows enlarged TEM images of the nanorod-shaped nanoparticles. It is clearly seen that R-2 and R-3 mainly have slit-shape pores and both of them have a larger surface area than R-1 which has larger (4-20 nm) circular pores and smaller specific surface area. The reason why R-1 having smaller surface area has higher activity may be related to the circular pore shape. That is to say, the circular pores may provide a favorable space for interaction between ferrous ions and the substrate, resulting in much higher catalytic activity compared to the other nanorods having slit-shape pores. To compare R-2 with R-3, the difference in length between them is not significant but there is a considerable difference in surface area and catalytic activity. The reason may be explained on the basis of the enlarged images of R-2 and R-3 (FIG. 11). Both of the nanorods mainly possess slit-shaped pores. Although the number of pores on R-3 is larger than that on R-2, the pore size (less than 1 nm) is not large enough to facilitate interaction between the substrate and the ferrous ions. In contrast, although R-2 has a smaller number of pores, the higher catalytic activity suggests that the pore size is large enough to facilitate interaction between the substrate and the ferrous ions than that of R-3. Accordingly, it can be seen that the pore shape and structure also contribute to the peroxidase mimic activity of rod-shaped nanomaterials.

As described above, it was confirmed for the first time that the hexagonal prism-shaped, sphere-shaped and rod-shaped nanostructured $\alpha$-$Fe_2O_3$ nanoparticles prepared according to the present disclosure have peroxidase mimic activity. Through analysis of the $V_{max}$, $K_m$ and $K_{cat}$ values of the $\alpha$-$Fe_2O_3$ nanomaterials, it was verified that the peroxidase mimic activity is determined by the surface area, structure and pore shape of the nanomaterials. The hematite $\alpha$-$Fe_2O_3$ nanoparticles having one-dimensional structure exhibited better enzyme mimic activity than their zero-dimensional or multi-dimensional counterparts.

Test Example 2

Characterization of Hematite Iron Oxide Nanostructures Prepared in Synthesis Example 2

(1) X-ray diffraction (XRD) patterns were obtained with a Rigaku 1200 diffractometer with CuKa radiation using a Ni $\beta$-filter at a scan rate of 4°/min. The X-ray source was operated at 40 kV and 30 mA. Raman spectra were recorded on a Renishaw Raman microscope using Ar ion laser ($\lambda$=514.5 nm). Average crystal size of $\alpha$-$Fe_2O_3$ powder was determined using the XRD Scherrer equation (average crystal size=$0.9\lambda/(\beta \cos \theta)$, where $\lambda$ is 1.540562 Å, $\beta$ is the increase of width at half peak height (WHPH) in radian units and $\theta$ is the Bragg angle). This equation was applied for the (104) peak of each sample.

The surface structure of the synthesized sample was investigated using a scanning electron microscope (SEM, LEO 1455VP, Hitachi S-4700) at an acceleration voltage of 25 kV. Fourier transform infrared (FTIR) spectra were recorded using the PerkinElmer Spectrum One instrument at 4,000-400 cm$^{-1}$ according to the KBr pellet method. Magnetic properties were measured using a superconducting quantum interference device (SQUID) magnetometer (MPMS-7XL, Quantum Design™). Magnetic hysteresis was measured at 5 K and 300 K in the range from 5 T to −5 T. Temperature dependence of magnetic susceptibility was measured at 5-350 K under a magnetic field of 1000 Oe by the zero-field cooling (ZFC) method and the field cooling (FC) method.

Figure 13:
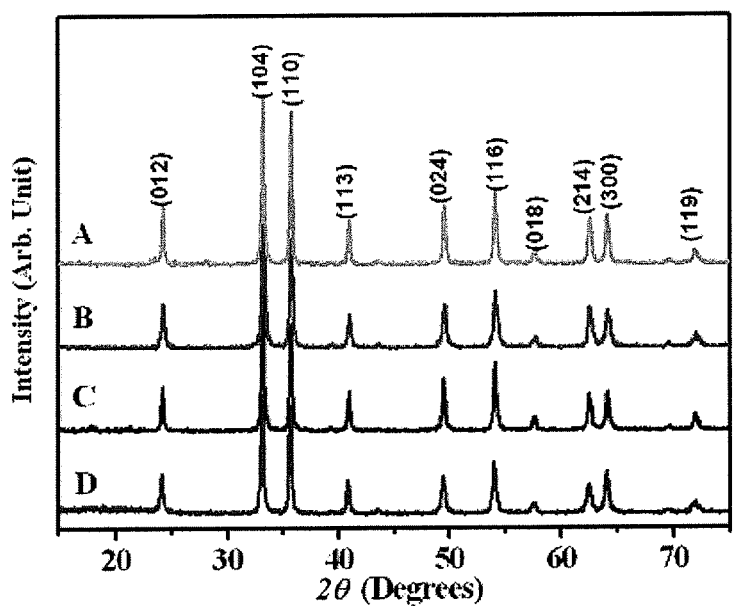
FIG. 13 shows XRD patterns of cube-shaped (SW), grape-shaped (SE), dumbbell-shaped (SP) and microsphere-shaped (SM) $\alpha$-$Fe_2O_3$ prepared in Synthesis Example 2 using different solvents.

(2) FIG. 13 shows the XRD patterns of the cube-shaped (SW), grape-shaped (SE), dumbbell-shaped (SP) and microsphere-shaped (SM) α-Fe$_2$O$_3$ prepared in Synthesis Example 2 using different solvents. The diffraction patterns of all the hematite iron oxide structure coincided precisely, suggesting that the structures prepared using different solvents have the same (rhombohedral) crystal phase in spite of the difference in shape. The iron oxide obtained in Synthesis Example 2 was in very pure state since no other peak corresponding to different phase was observed. The average crystal diameter of SW, SE, SP and SM calculated by the Scherrer equation was 31, 33, 28 and 35 nm, respectively. That is to say, the crystal size was similar irrelevant of the solvents used.

Figure 14:
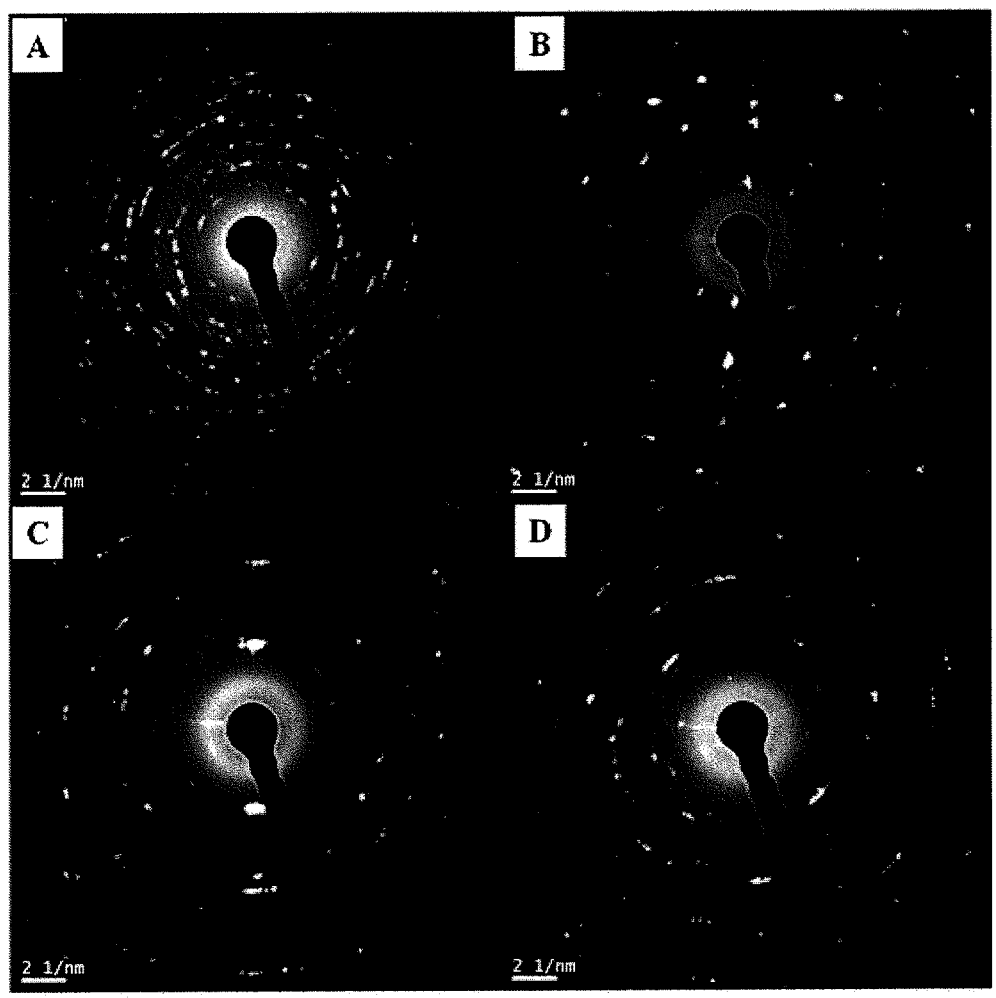
FIG. 14 shows TEM images showing crystal structures of hematite iron oxide prepared in Synthesis Example 2 in selected area electron diffraction (SAED) mode.

(3) In order to determine crystallinity of the iron oxide, TEM images were obtained in selected area electron diffraction (SAED) mode (see FIG. 14). The diffraction patterns were neither that of polycrystals (rings) nor that of single crystals (dots) but showed elongated irregular dots with discontinuous rings. This means that the particles consist of aggregates of a number of small crystals aligned in the same direction. From this observation, it can be seen that the α-Fe$_2$O$_3$ structures are formed by a procedure wherein a number of small crystals are aggregated by self-assembly to form larger crystals and the irregular or discontinuous SAED patterns are observed due to the difference in the orientation of the small crystals.

Figure 15:
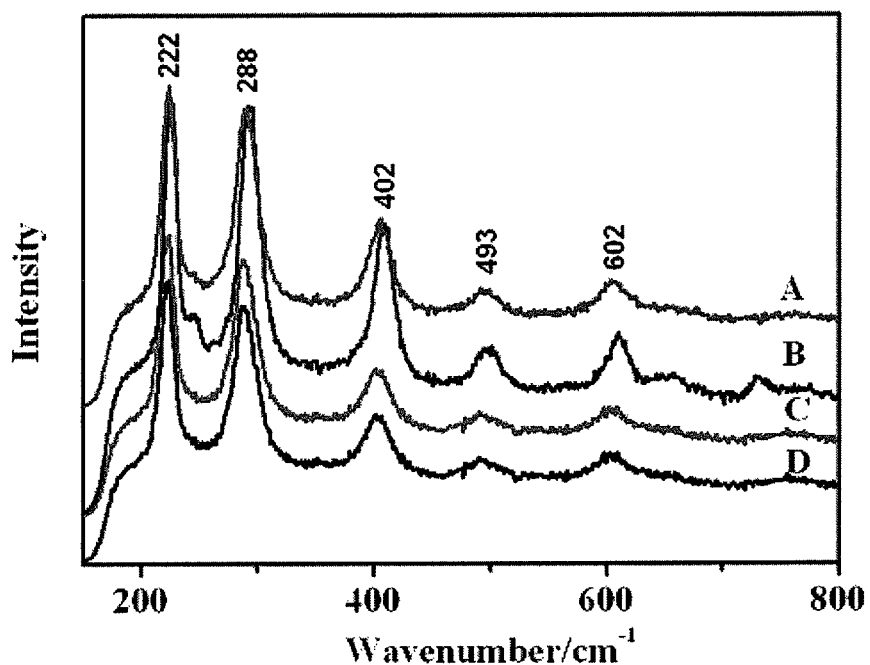
FIG. 15 shows Raman spectra of hematite iron oxide synthesized in Synthesis Example 2.
Figure 16:
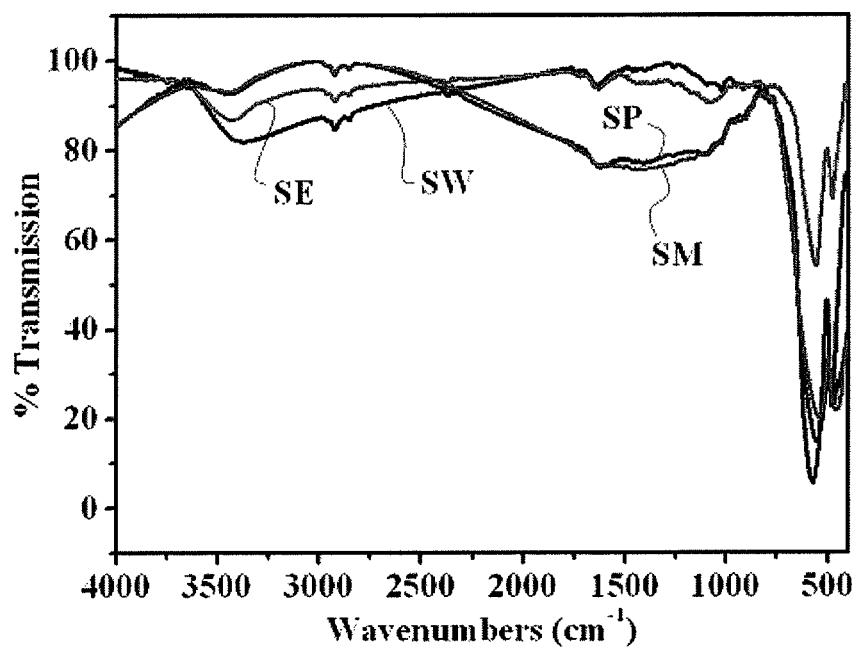
FIG. 16 shows Fourier transform IR spectra of hematite iron oxide synthesized in Synthesis Example 2.

(4) Raman spectroscopy, which is a non-destructive technique to characterize crystalline or amorphous materials, was used to investigate surfaces conditions and uniformity. The Raman spectra of the α-Fe$_2$O$_3$ nanostructures shown in FIG. 15 exhibit strong resonance peaks at about 222, 288, 402, 493 and 602 cm$^{-1}$ in the range from 200 to 800 cm$^{-1}$. The position and intensity of the peaks are in good agreement with those of α-Fe$_2$O$_3$, implying high crystallinity and purity of the prepared iron oxide. The weak peaks at 630 cm$^{-1}$ and 720 cm$^{-1}$ observed in FIG. 15 (B) correspond to impurities, which may be due to the presence of γ-Fe$_2$O$_3$. Both the XRD patterns and Raman spectra confirm the formation of pure α-Fe$_2$O$_3$ nanostructures. The formation of α-Fe$_2$O$_3$ phase is further confirmed by the Fourier transform IR spectra shown in FIG. 16. All the four α-Fe$_2$O$_3$ samples show two absorption peaks at ~465 cm$^{-1}$ and ~560 cm$^{-1}$, which are assigned to the stretching vibration frequency of Fe—O in α-Fe$_2$O$_3$.

Figure 17:
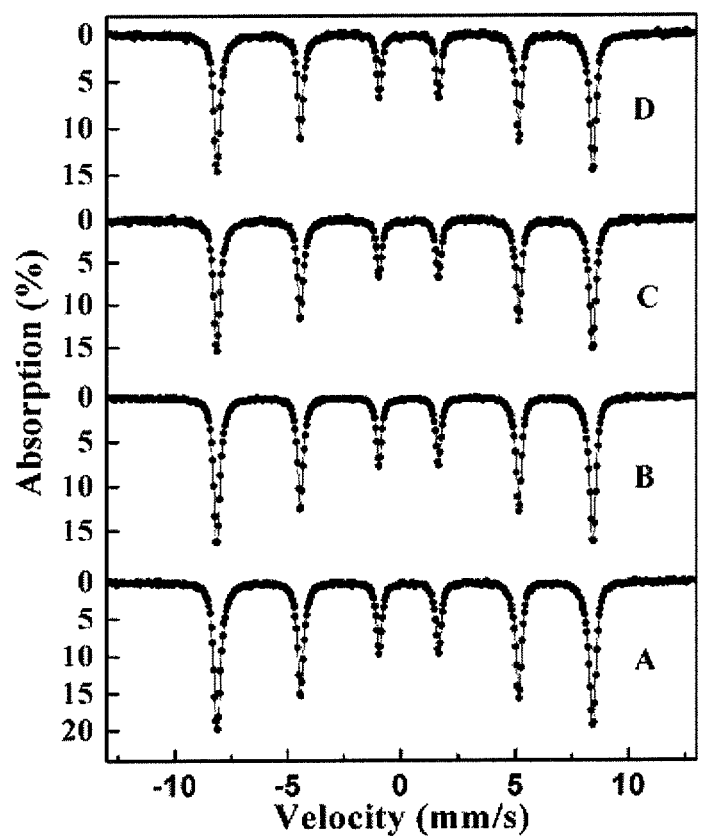
FIG. 17 shows transmission Mössbauer spectra of hematite iron oxide synthesized in Synthesis Example 2 at room temperature.

(5) FIG. 17 shows transmission Mössbauer spectra of the samples prepared using different solvents at room temperature. The Mössbauer spectra were recorded using $^{57}$Co source (50 mCi) in Rh matrix in constant acceleration mode. The spectra of the four samples were similar and showed 6 narrow peaks. The reason why 6 peaks appear is due to the ferromagnetic characteristics of the hematite nanoparticles. The spectra were fitted by peaks of Lorentzian shape using a least square fitting method for estimation of Mossbauer parameters. The isomer shift relative to metallic Fe of δ=0.255-0.259 mm/s was determined by computer-aided analysis, which was consistent with ferric state (Fe$^{3+}$) in oxide materials. The isomer shift was much smaller than expected and was influenced by the synthesis method. In particular, a high-temperature hydrothermal process using an autoclave resulted in small isomer shift. Also, the electric quadrupolar shift was found to be ε=−0.105 to −0.107 mm/s. The hyperfine magnetic field of the nanostructures was 51.48-51.52 T. The isomer shift, quadrupolar shift and hyperfine magnetic field obtained from the six peak patterns were close to the typical values of α-Fe$_2$O$_3$. Accordingly, it can be concluded that the synthesized samples consist only of the α-Fe$_2$O$_3$ crystalline phase.

Figure 18:
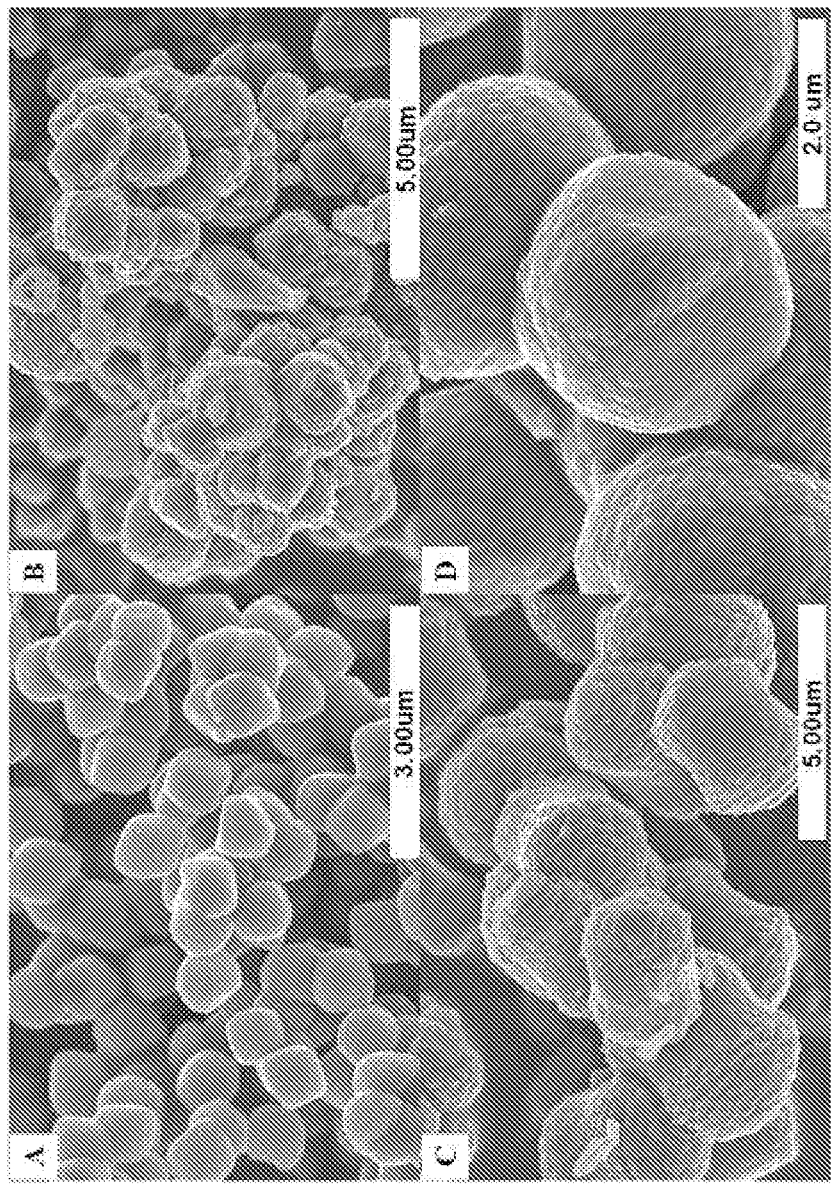
FIG. 18 shows SEM images of iron oxide structures synthesized in Synthesis Example 2 using different solvents and caffeine at 180° C.

(6) FIG. 18 shows SEM images of the iron oxide structures synthesized using different solvents and caffeine at 180° C. The iron oxides were synthesized without using a template or a growth-inducing agent.

As seen from FIG. 18 (A), uniform cube-shaped iron oxide nanostructures were formed with high yield when water was used as a solvent. The physical properties of the nanostructured materials such as shape, size and structure were highly dependent on the solvent used. In particular, the morphology of iron oxide was very sensitive to the concentration of reactants and the type of alcohols. The detailed experimental conditions including solvent and reactant concentrations are described in [Table 1].

When ethanol was used as the solvent, the uniformity of the shape and size of the iron oxide is poor and the particles are badly aggregated as shown in FIG. 18 (B). A disorder, grape-shaped microstructure was formed by aggregation of a large quantity of small nanoclusters. When propanol was used, a uniform dumbbell-shaped iron oxide structure was formed (see FIG. 18 (C)). FIG. 18 (D) is an SEM image of the nanostructure synthesized using methanol. From these results, it can be seen that the solvent plays a vital role in the formation of α-Fe$_2$O$_3$ superstructures.

The particle size of SW, SE, SP and SM determined from the SEM images was about 700±10 nm, 1300±50 nm, 4000±100 nm and 2800±80 nm, respectively. The particle sizes of the samples measured from the SEM images were much larger than the average crystal sizes calculated by XRD. This reveals that each particle is a superstructure (a single crystalline mesocrystal) in nature and consists of a large number of small single crystalline subparticles of tens of nanometers in size. This is also in agreement with the SAED patterns shown in FIG. 14.

The Brunauer-Emmett-Teller (BET) surface area of SW, SE, SP and SM determined from the nitrogen adsorption-desorption isotherms was 22.6 m$^2$/g, 28.7 m$^2$/g, 12.8 m$^2$/g and 10.4 m$^2$/g, respectively (see [Table 4]). The small surface area implies that the α-Fe$_2$O$_3$ prepared according to the present disclosure is dense and nonporous in nature.

TABLE 4

| | Particle size (nm) | Average crystallite diameter (nm) | Surface area (m$^2$/g) | Coercivity (Oe) | |
|---|---|---|---|---|---|
| | | | | 5K | 300K |
| Synthesis Example 2-(1) | 700 ± 10 | 31 | 22.6 | 1450 | 7375 |
| Synthesis Example 2-(2) | 1300 ± 50 | 33 | 28.7 | 1730 | 6250 |
| Synthesis Example 2-(3) | 4000 ± 100 | 28 | 12.8 | 870 | 6000 |
| Synthesis Example 2-(4) | 2800 ± 80 | 35 | 10.4 | 410 | 2510 |

(7) Time-dependent experiments were carried out to investigate the growth process of the hematite superstructures. Hydrothermal reaction was conducted at 180° C. for 1 hour, 4 hours, 8 hours and 10 hours in different solvents.

Figure 19:
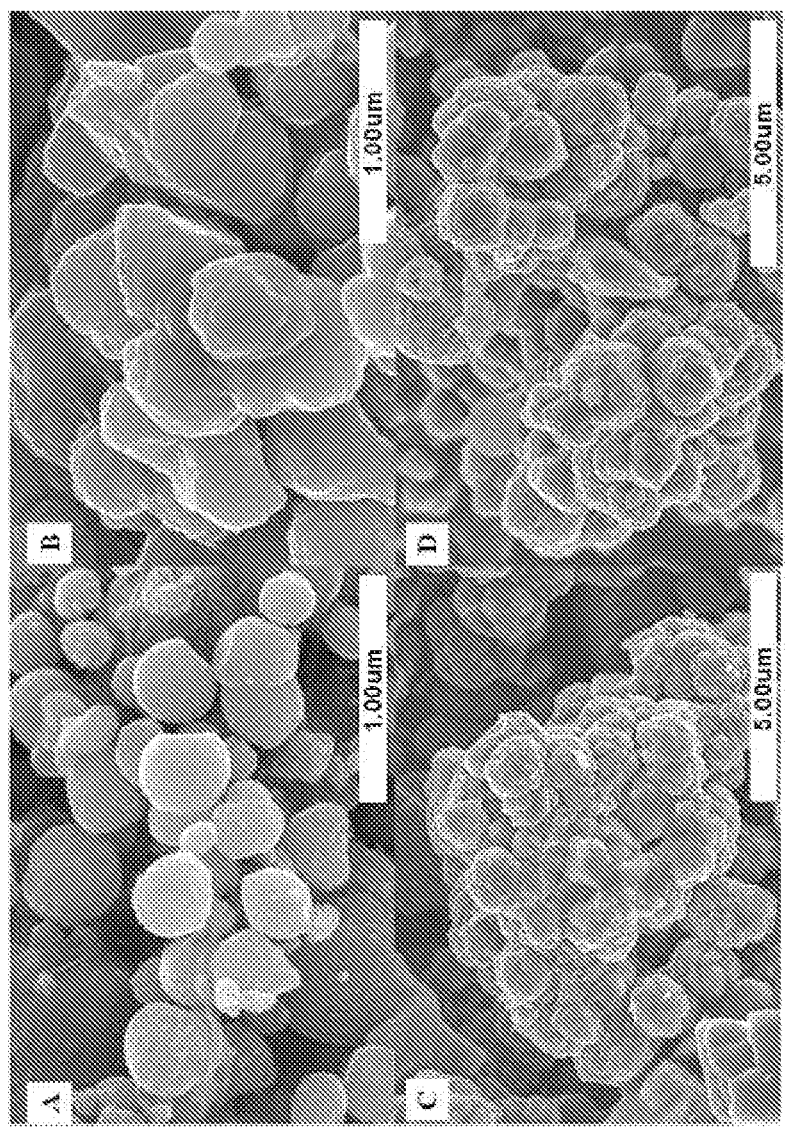
FIG. 19 shows SEM images of iron oxide structures synthesized in Synthesis Example 2 using ethanol as a solvent for hydrothermal synthesis time of 1, 4, 8 and 10 hours.

A. As shown in FIG. 19, non-homogenous particles were obtained after hydrothermal treatment for 1 hour using ethanol as a solvent. When the reaction time was prolonged to 4 hours, 8 hours and 10 hours, the particles aggregated together into disordered grape-shaped microstructures. This can be explained by random aggregation of nanocrystals by typical Ostwald ripening, resulting in irregular superstructures rather than uniform microstructures.

Figure 20:
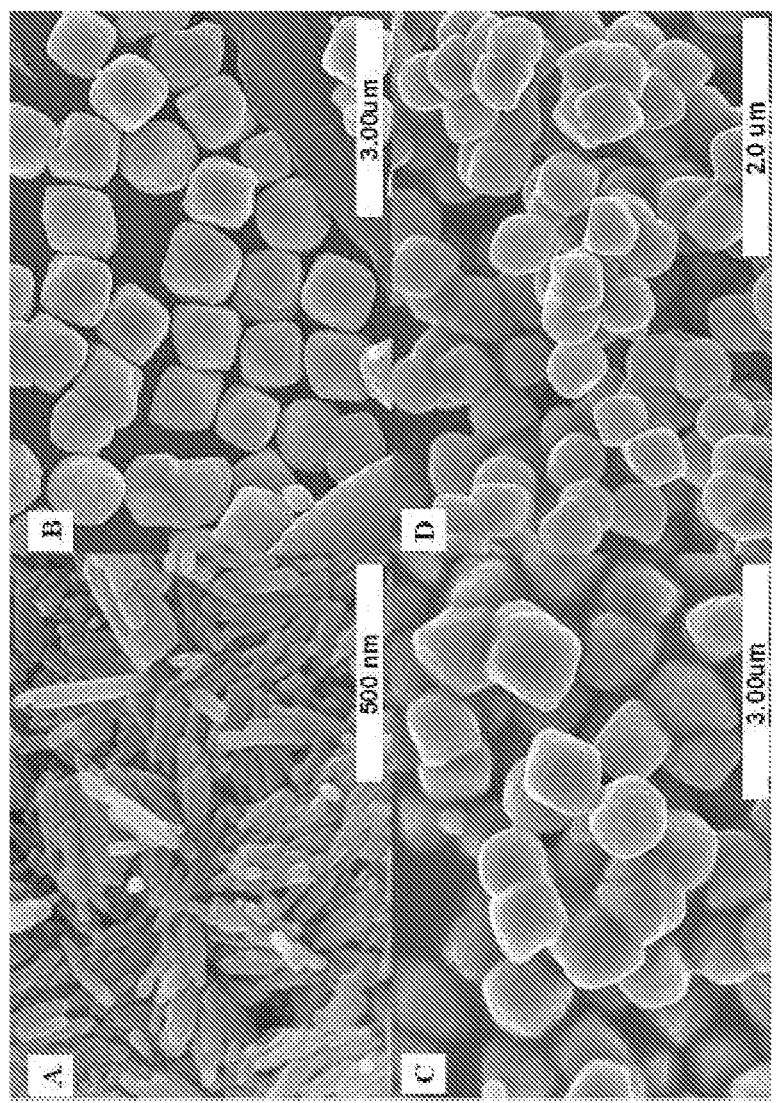
FIG. 20 shows SEM images of iron oxide structures synthesized in Synthesis Example 2 using water as a solvent for hydrothermal synthesis time of 1, 4, 8 and 10 hours.

B. FIG. 20 shows SEM images of the hematite synthesized using water as a solvent. When the reaction was conducted at 180° C. for 1 hour, rod-shape particles were formed. When the reaction time was increased to 4 hours, the rod-shape particles were self-organized to irregular cube-shaped particles. After reaction for 8 hours, more uniform particles were observed. When the reaction was conducted for 10 hours, most of the particles were cube-shaped. From these results, it can be seen that neighboring rod-shape particles aggregate through oriented attachment and form uniform cube-shaped nanostructures.

Figure 21:
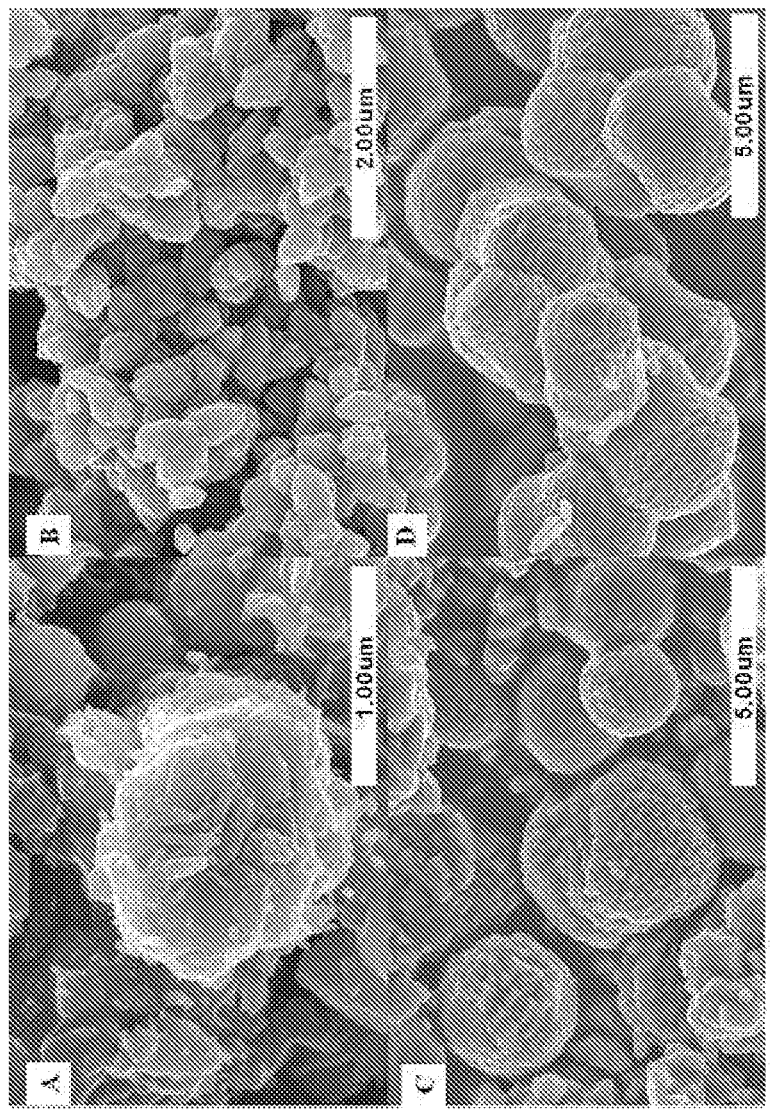
FIG. 21 shows SEM images of iron oxide structures synthesized in Synthesis Example 2 using propanol as a solvent for hydrothermal synthesis time of 1, 4, 8 and 10 hours.

C. In case of propanol, small iron oxide nanocrystals were produced in short time by nucleation as shown in FIG. 21. When the reaction time was prolonged, the nanocrystals aggregated to form larger nanostructures and finally diffused to form dumbbell-shaped iron oxide.

Figure 22:
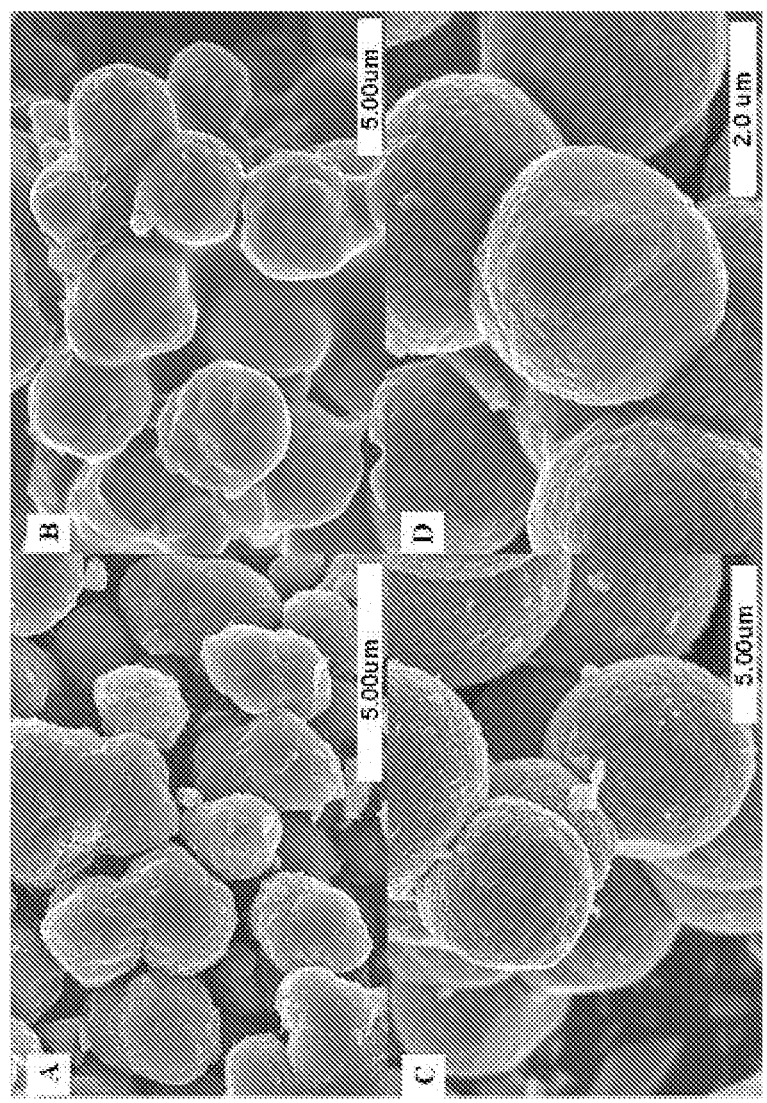
FIG. 22 shows SEM images of iron oxide structures synthesized in Synthesis Example 2 using methanol as a solvent for hydrothermal synthesis time of 1, 4, 8 and 10 hours.

D. When methanol was used as the solvent, the spherical microstructure was not formed at early stage of reaction and no significant difference was observed even after the reaction time was increased, as shown in FIG. 22. These results support the self-assembling process of small nanocrystals or particles to form larger $\alpha$-Fe$_2$O$_3$ superstructures.

E. However, the particle size decreased when the reaction time was increased in all cases.

Figure 12:
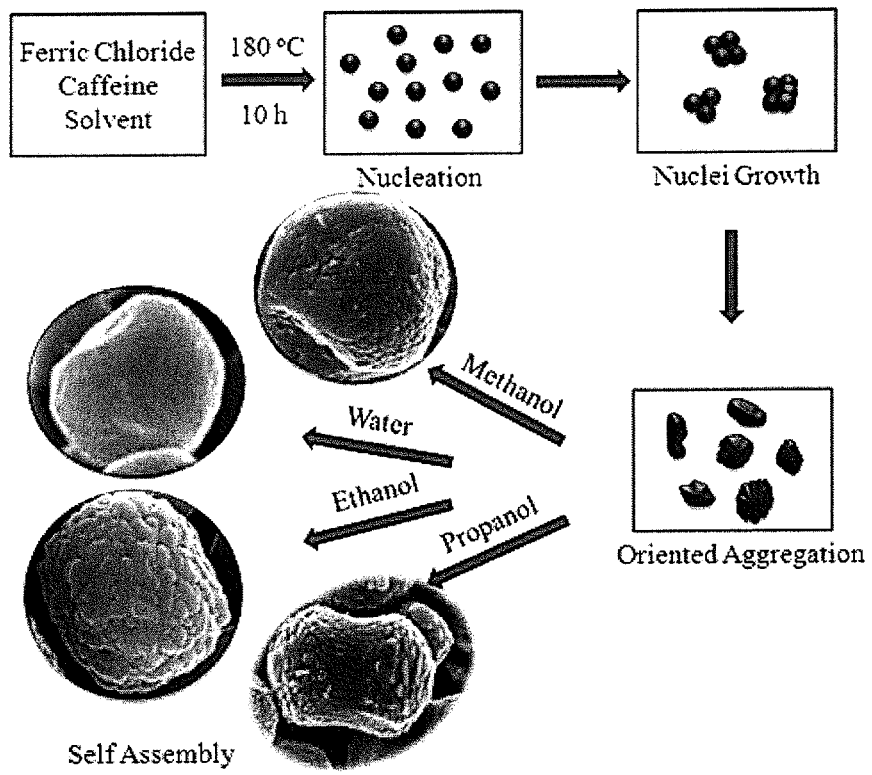
FIG. 12 schematically shows a procedure of preparing hematite iron oxide of various nano superstructures in Synthesis Example 2 using different solvents.

(8) The formation of the $\alpha$-Fe$_2$O$_3$ superstructures aided by caffeine ([Chemical Formula 1]) occurs in three steps of 1) nucleation, 2) oriented aggregation and 3) self-assembling recrystallization, as shown in FIG. 12.

[Chemical Formula 1]

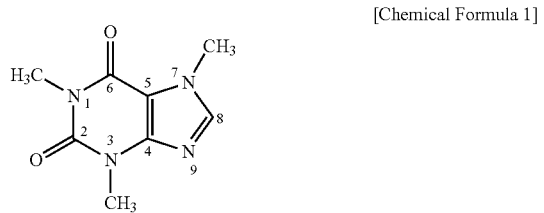

Interaction between caffeine and iron metal can be realized via the oxygen and nitrogen atoms of caffeine. Caffeine is known to bind to iron metal through the oxygen atoms of C(2) and C(6). The formation of microsized hematite iron oxide is achieved by a simple self-assembling process, which occurs as a series of nucleation, oriented aggregation and self-assembling recrystallization under high-temperature solvothermal conditions including complex formation of metal salts with caffeine and simultaneous reduction of the iron precursor at high temperature (180° C., hydrothermally).

The nucleation step corresponds to the formation of primary nanocrystals including growth of nuclei. The oriented aggregation step is a process where self-assembly occurs by Ostwald ripening, directing the formation of small irregular nanostructure particles and crystals by oriented aggregation of the primary particles. In the final self-assembling recrystallization step, many single domains are fused into a multiple domain and regular morphological structures are shaped overall.

Figure 23:
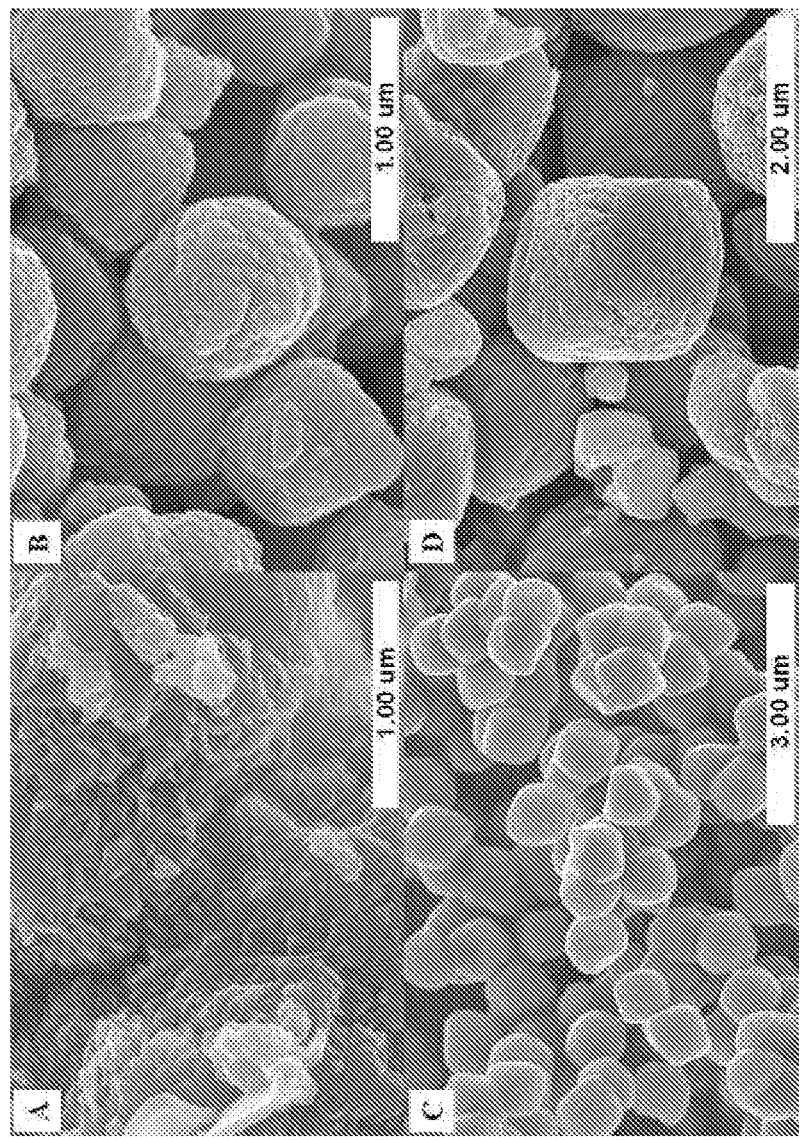
FIG. 23 shows SEM images of iron oxide structures synthesized in Synthesis Example 2 using water as a solvent and varying concentrations of caffeine.

The role of caffeine was investigated by varying the ratio of the iron precursor to caffeine in the reaction mixture using water as a solvent. When caffeine was not included in the reaction mixture (blank), aggregated iron oxide flakes were observed as shown in FIG. 23 (A). The irregularity of microstructure increased as the content of caffeine in the reaction mixture was decreased (0.25 mmol) or increased (0.5 mmol). That is to say, the iron oxide obtained by increasing or decreasing the caffeine content showed almost similar irregularity in terms of shape and size.

(9) In the formation of hematite superstructures, selection of an appropriate solvent plays a critical role. When water used as a solvent, oriented aggregation and recrystallization of rod-shape iron oxide occurred dominantly to produce well-dispersed, uniform cube-shaped iron oxide nanostructures. When the solvent was changed from water to ethanol, new nanometer-sized iron oxide particles were formed. Ethanol can be used as a weak reducing agent and plays a vital role in the formation of nanostructures. When ethanol is used as the solvent, it is thought that the degree of complex formation of caffeine with iron ions (Fe$^{+3}$) changes considerably due to the change in environment. The growth of iron oxide nuclei decreased dramatically, and smaller nanoclusters were formed and then self-assembled to produce iron oxide microstructures consisting of small nanoparticles. Also, when the solvent was changed from propanol to methanol, different iron oxide nanostructures were formed through similar nucleation, aggregation and recrystallization processes.

In addition, the formation process of $\alpha$-Fe$_2$O$_3$ crystals follows different trends for different solvent compositions, leading to superstructures of various morphologies. The polarity of the solvent has a significant effect on the shape and structure of the formed iron oxide nanoparticles.

The polarity of the four solvents used is as follows: water>methanol>ethanol>propanol, with water being the most electronegative and propanol being the least polar. Since the size of the particles tends to increase with decreased polarity, a correlation between particle size and solvent polarity can be inferred. Water which has the highest electronegativity leads to formation of smaller particles while less polar alcohols lead to increase in particle size depending on their polarity. The iron oxide particles obtained using water (polarity index=10.2) were uniform cubes in shape. The iron oxide structures obtained using alcohols (methanol, ethanol and propanol; polarity index=5.1, 4.3 and 4.0, respectively) were microsphere-shaped, grape-shaped and dumbbell-shaped, respectively. For the nanostructure obtained using alcohols, the agglomeration tendency is of particular importance because small particles are grouped into larger aggregates, leading to different morphology. The reason behind the smaller particle size for a more polar solvent is related to the good dissolution and fast nucleation growth of the precursor, leading to formation of many smaller uniform particles. Some morphologies such as dumbbell and grape shapes have never been reported for hematite $\alpha$-Fe$_2$O$_3$ in micro scale.

(10) Magnetic hysteresis of the $\alpha$-Fe$_2$O$_3$ superstructures prepared in Synthesis Example 2 was measured using a superconducting quantum interference device (SQUID).

Figure 24:
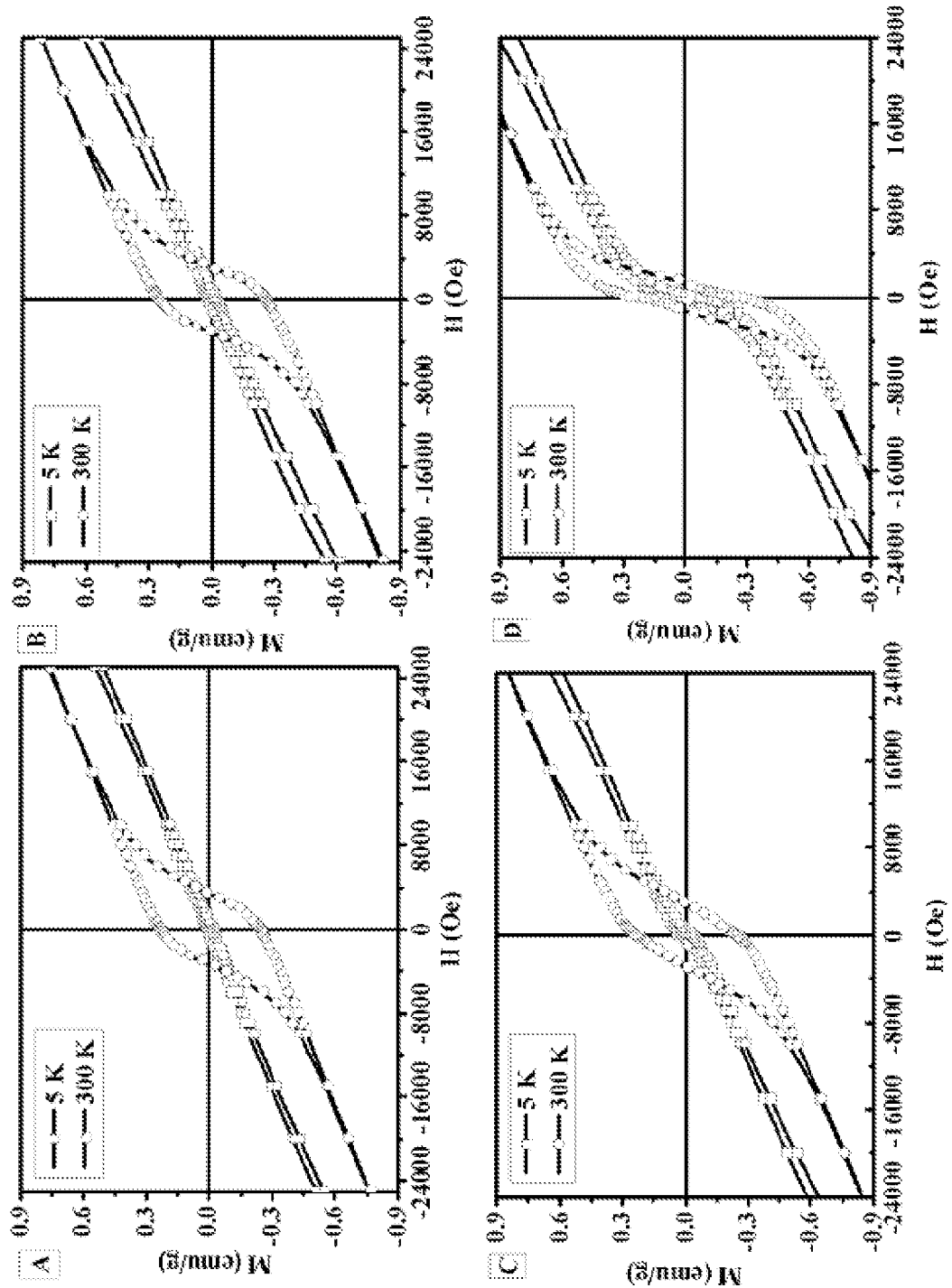
FIG. 24 shows magnetic hysteresis curves of iron oxide structures synthesized in Synthesis Example 2 using different solvents and caffeine at 5 K and 300 K.

A. FIG. 24 shows magnetic hysteresis curves of the $\alpha$-Fe$_2$O$_3$ samples at 5 K and 300 K. The coercivity was much higher at room temperature (0.25 T, 0.60 T, 0.63 T and 0.74 T) than at 5 K (0.04 T, 0.09 T, 0.17 T and 0.15 T) for all the $\alpha$-Fe$_2$O$_3$ samples. This behavior is due to the hematite structure exhibiting Morin transition (MT), which causes change from a pure antiferromagnet to a weak ferromagnet below $M_T$ because the net magnetic moment disappears.

Figure 25:
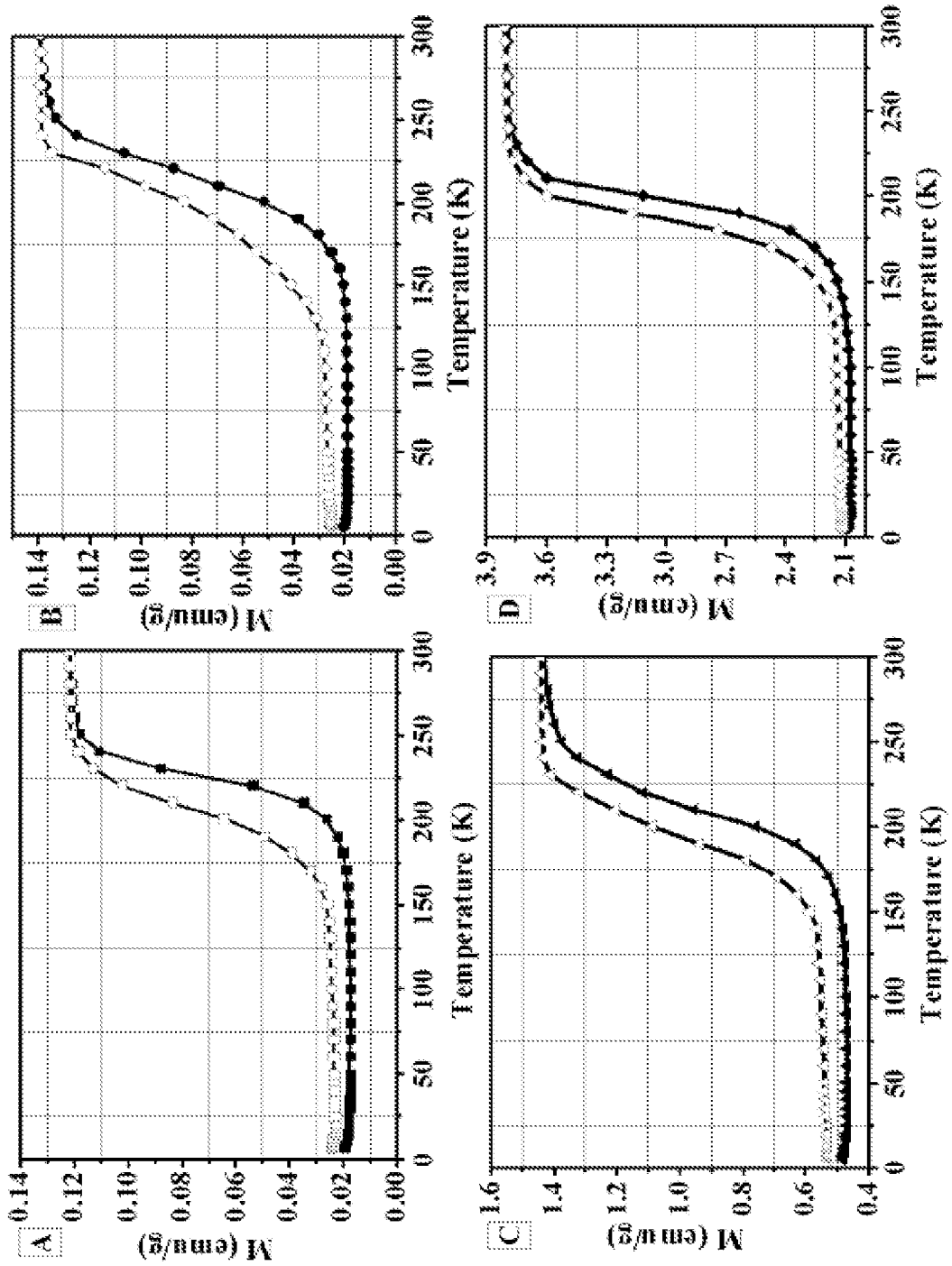
FIG. 25 shows a result of measuring magnetic susceptibility of oxide structures synthesized in Synthesis Example 2 using different solvents and caffeine at 5-350 K under a magnetic field of 1000 Oe by a zero-field cooling (ZFC) method and a field cooling (FC) method.

B. In order to investigate temperature dependence of magnetic properties, magnetic susceptibility was measured at 5-350 K under a magnetic field of 1000 Oe by a zero-field cooling (ZFC) method and a field cooling (FC) method (see FIG. 25). The splitting between the field-cooled and zero-field-cooled curves at high temperature (~260 K) is indicative of the $M_T$ of the $\alpha$-Fe$_2$O$_3$ nanostructures. The sharp drop in magnetic susceptibility at ~260 K suggests that all these samples undergo such transition, resulting in the reversed nature of coercivity.

Comparative data of coercivity of various α-Fe$_2$O$_3$ nanostructures are given in [Table 5]. It is to be noted that the cube-shaped Fe$_2$O$_3$ nanoparticles synthesized according to the present disclosure have very high coercivity at room temperature compared to the hematite structures available in the literatures.

The cited literatures are as follows.

25: N. K. Chaudhari, H. C. Kim, D. Son and J.-S. Yu, *CrystEngComm*, 2009, 11, 2264-2267.

44a: J. Lian, X. Duan, J. Ma, P. Peng, T. Kim and W. Zheng, *ACSNano*, 2009, 3, 3749-3761.

44b: Z. An, J. Zhang, S. Pan and F. Yu, *J. Phys. Chem. C*, 2009, 113, 8092-8096.

46: L. P. Zhu, H. M. Xiao, X. M. Liu and S. Y. Fu, *J. Mater. Chem.*, 2006, 16, 1794-1797.

47a: S. Mitra, S. Das, K. Mandal and S. Chanduari, *Nanotechnology*, 2007, 18, 275608(1-9).

47b: S. Mitra, S. Das, S. Basu, P. Sahu and K. Mandel, *J. Magn. Magn. Mater*, 2009, 321, 2925-2931.

TABLE 5

| Shape | Coercive field (Oe) | Literatures |
|---|---|---|
| Urchin | 93 | 46 |
| Hexagonal prism | 200 | 25 |
| Spindle | 315 | 47b |
| Cube | 1080 | 44a |
| Rhombohedron | 1255 | 47a |
| Porous hollow sphere | 2239 | 44a |
| Spindle | 3248 | 44b |
| Sphere | 4225 | 44b |
| Ellipsoid | 4539 | 44b |
| Cube | 7375 | The present disclosure |

In general, surface area increases as particle size decreases and so does coercivity with decreased particle size. However, the dumbbell-shaped particles prepared using propanol as the solvent do not follow this trend. They possess high coercivity despite larger particle size and surface area because they have micro size (4000 nm).

The hematite α-Fe$_2$O$_3$ synthesized according to the present disclosure have high coercivity while having a small surface area and a large particle size of 700-4000 nm. It is because the α-Fe$_2$O$_3$ superstructures prepared by self-assembling aggregation and recrystallization of small nanoclusters or nanoparticles have multidomain characters. Another reason is the shape anisotropy, which makes the reversal of magnetic spins difficult and prevents the nanocrystals from being magnetized in directions other than the magnetic axes.

Hence, the high coercivity of the α-Fe$_2$O$_3$ nanostructures originates from their unique shape characters. In general, spherical shape has lower anisotropy than other less symmetric shapes, which is in good agreement with the observed relatively lower coercivity of the sphere-shaped SM nanostructures. The coercivity of the iron oxide nanostructures increases in the order of SW>SE>SP>SM at room temperature and in the order of SE>SW>SP>SM at 5 K. Furthermore, as described above, aggregation of small α-Fe$_2$O$_3$ nanostructures results in the change from single domain crystals into a multiple domain superstructure. As a result, the shape anisotropy of the α-Fe$_2$O$_3$ superstructures increases.

As described, in accordance with the present disclosure, α-Fe$_2$O$_3$ superstructures of various shapes including grape, cube, dumbbell and microsphere shapes can be synthesized using caffeine in the presence of different solvents without using a growth-inducing agent and without separation based on size. The shapes can be controlled variously via a simple and environment-friendly one-step synthesis route. Various conditions such as reaction time, caffeine and solvent concentrations and the solvent used greatly affect the structure of iron oxide. In particular, the polarity of the solvent has a significant effect on the shape and structure of the iron oxide nanoparticles. Some morphologies such as dumbbell and grape shapes have never been reported for hematite α-Fe$_2$O$_3$ in micro scale.

Interestingly, the α-Fe$_2$O$_3$ prepared according to the present disclosure exhibits much higher coercivity at room temperature than at low temperature. The coercivity of the cube-shaped Fe$_2$O$_3$ nanostructure at room temperature is higher than any previously reported value. The high coercivity value originates from the small multiple domain microstructures formed in the α-Fe$_2$O$_3$ and anisotropy of particle size and shape.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing hematite iron oxide comprising multiple crystallites having orientation and formed by self-assembling aggregation, comprising:
    preparing a mixture solution by adding iron chloride and caffeine to solvent and magnetically stirring; and
    performing synthesis at 150-200° C. for 4-12 hours,
    wherein the solvent is selected from the group consisting of water, ethanol, propanol and methanol, and
    wherein the molar ratio of iron chloride and caffeine is 10-50:1.

2. The method for preparing hematite iron oxide according to claim 1, wherein the shape of the hematite iron oxide is controlled by adjusting the molar ratio of iron chloride and caffeine, varying the solvent and adjusting the hydrothermal synthesis time.

3. The method for preparing hematite iron oxide according to claim 1, wherein the hematite iron oxide has a shape of an urchin, hexagonal prism, spindle, rhombohedron, porous hollow sphere, ellipsoid, grape, dumbbell or sphere.

4. The method for preparing hematite iron oxide according to claim 1, wherein the crystallites have a diameter of 30-40 nm and the hematite iron oxide has a diameter of 500-6000 nm and a BET surface area of 10-180 m$^2$/g.

5. The method for preparing hematite iron oxide according to claim 1, wherein the hematite iron oxide has a higher coercivity at room temperature (300 K) than at low temperature (5 K) and has a coercivity of 0.25-1.10 T at 300 K.

* * * * *